US011556927B2

(12) United States Patent
Edington et al.

(10) Patent No.: US 11,556,927 B2
(45) Date of Patent: Jan. 17, 2023

(54) SYSTEMS AND METHODS FOR ANALYSES AND ACTION APPROVALS USING A LEDGER

(71) Applicant: Deep Labs Inc., San Francisco, CA (US)

(72) Inventors: Scott Edington, Arlington, VA (US); Patrick Faith, Pleasanton, CA (US); Jiri Novak, Mill Valley, CA (US)

(73) Assignee: DEEP LABS INC, San Mateo, CA (US)

( * ) Notice: Subject to any disclaimer, the term of this patent is extended or adjusted under 35 U.S.C. 154(b) by 83 days.

(21) Appl. No.: 16/926,099

(22) Filed: Jul. 10, 2020

(65) Prior Publication Data
US 2021/0110387 A1     Apr. 15, 2021

Related U.S. Application Data

(60) Provisional application No. 62/912,870, filed on Oct. 9, 2019.

(51) Int. Cl.
| | |
|---|---|
| *G06Q 40/00* | (2012.01) |
| *G06Q 20/38* | (2012.01) |
| *G06Q 20/40* | (2012.01) |
| *G06F 7/14* | (2006.01) |
| *G06F 16/23* | (2019.01) |

(52) U.S. Cl.
CPC ............. *G06Q 20/389* (2013.01); *G06F 7/14* (2013.01); *G06F 16/2379* (2019.01); *G06Q 20/40* (2013.01)

(58) Field of Classification Search
CPC .. G06Q 20/389; G06Q 20/40; G06F 16/2379; G06F 7/14; H04L 9/0637
USPC .............................................. 705/44, 40, 18
See application file for complete search history.

(56) References Cited

U.S. PATENT DOCUMENTS

| | | | |
|---|---|---|---|
| 2005/0086171 A1* | 4/2005 | Abe ........................ | G06Q 30/06 705/51 |
| 2007/0087756 A1* | 4/2007 | Hoffberg ................ | G06Q 20/40 455/450 |
| 2007/0159301 A1* | 7/2007 | Hirt ........................ | H04W 12/04 340/10.1 |
| 2009/0259537 A1* | 10/2009 | Veksler ................. | G06Q 20/306 705/14.4 |
| 2011/0077086 A1* | 3/2011 | Grube ..................... | H04L 69/16 463/42 |
| 2011/0078080 A1* | 3/2011 | Grube .................. | G06F 21/6218 705/44 |

(Continued)

*Primary Examiner* — Ojo O Oyebisi
(74) *Attorney, Agent, or Firm* — Finnegan, Henderson, Farabow, Garrett & Dunner, LLP

(57) ABSTRACT

The present disclosure relates to systems and methods for creating and using personas. The method includes receiving a first set of input signals associated with data from one or more source; receiving a second set of input signals associated with data from one or more source; converting the first set of input signals and the second set of input signals to a wavelet; constructing a persona based on the wavelet; storing the persona in a ledger; receiving a request for a decision related to a transaction; converting the request to a new wavelet; determining a difference between the new wavelet and the stored persona; generating a score based on the difference; and authorizing the transaction based on the score.

16 Claims, 22 Drawing Sheets

(56) References Cited

U.S. PATENT DOCUMENTS

| | | | |
|---|---|---|---|
| 2012/0110341 A1* | 5/2012 | Beigi | H04W 12/069 |
| | | | 713/186 |
| 2012/0173427 A1* | 7/2012 | Sparks | G07F 7/1008 |
| | | | 705/44 |
| 2014/0006191 A1* | 1/2014 | Shankar | H04W 8/005 |
| | | | 705/18 |
| 2014/0067679 A1* | 3/2014 | O'Reilly | G06Q 20/40145 |
| | | | 705/44 |
| 2016/0014121 A1* | 1/2016 | Perna | G07C 9/37 |
| | | | 726/4 |
| 2016/0140567 A1* | 5/2016 | Hanna | G06Q 20/40145 |
| | | | 705/44 |
| 2019/0155997 A1* | 5/2019 | Vos | H04L 9/0637 |
| 2020/0238952 A1* | 7/2020 | Lindsay | B60R 25/25 |

* cited by examiner

SYSTEMS AND METHODS FOR ANALYSES AND ACTION APPROVALS USING A LEDGER

CROSS-REFERENCE TO RELATED APPLICATIONS

This application claims the benefit of priority to U.S. Provisional Application No. 62/912,870, filed Oct. 9, 2019, which is incorporated herein by reference.

TECHNICAL FIELD

The present disclosure relates generally to the field of digital ledgers. More specifically, and without limitation, this disclosure relates to systems and methods for creating and using digital personas stored on a digital ledger.

BACKGROUND

Extant methods of smart contract execution and fraud detection rely on models of transactions which attempt to determine which transactions are fraudulent. These models attempt to identify patterns in fraudulent activity. However, in cases where millions of transactions occur each day, such as for credit card transaction processing, large, complex models based on historical transactions introduce latency, slowing approval of a transaction and harming user experience.

In some scenarios, transaction authorizations exchange accuracy for speed. To increase approval speed, models are provided less data to reduce processing time. However, with less data, these models suffer from high rates of false-positive alerts, impacting user experience and impeding legitimate business.

Further, in order for trust to exist between parties who often do not know each other, parties must confirm their identities and qualifications for a transaction. For example, when applying for a loan, a person may have to verify address, income, and employment, all of which may be faked to fraudulently obtain a loan. Verification of these details is often costly and time consuming, resulting in decreased transaction volume, decreased profit, and decreased user experience.

Therefore, methods and systems that aid in verification of user identifies while also accelerating and improving fraud detection are desired.

SUMMARY

In view of the foregoing, embodiments of the present disclosure provide systems and methods for constructing and using wavelet databases to predict risk through neural networks.

As used herein, "database" refers to a "data space," which is a tertiary database that uses in-process RAM dictionaries, a shared memory data cache, a multi-process/multi-server object cache, and one or more common databases (e.g., a Structured Query Language (SQL) database) and/or Binary Large Objects (BLOBs).

According to an example embodiment of the present disclosure, a system for creating and using personas includes a memory storing instructions and at least one processor configured to execute the instructions to perform operations. The operations comprise receiving a first set of input signals associated with data from one or more source; receiving a second set of input signals associated with data from one or more source; converting the first set of input signals and the second set of input signals to a wavelet; constructing a persona based on the wavelet; storing the persona in a ledger; receiving a request for a decision related to a transaction; converting the request to a new wavelet; determining a difference between the new wavelet and the stored persona; generating a score based on the difference; and authorizing the transaction based on the score.

In another embodiment, a non-transitory computer-readable storage medium contains instruction that, when executed by one or more processors, cause the one or more processors to perform operations. The operations comprise receiving a first set of input signals associated with data from one or more source; receiving a second set of input signals associated with data from one or more source; converting the first set of input signals and the second set of input signals to a wavelet; constructing a persona based on the wavelet; storing the persona in a ledger; receiving a request for a decision related to a transaction; converting the request to a new wavelet; determining a difference between the new wavelet and the stored persona; generating a score based on the difference; and authorizing the transaction based on the score.

It is to be understood that the foregoing general description and the following detailed description are exemplary and explanatory only, and are not restrictive of the disclosed embodiments.

BRIEF DESCRIPTION OF THE DRAWINGS

The accompanying drawings, which comprise a part of this specification, illustrate several embodiments and, together with the description, serve to explain the principles disclosed herein. In the drawings.

DETAILED DESCRIPTION

Figure 1:
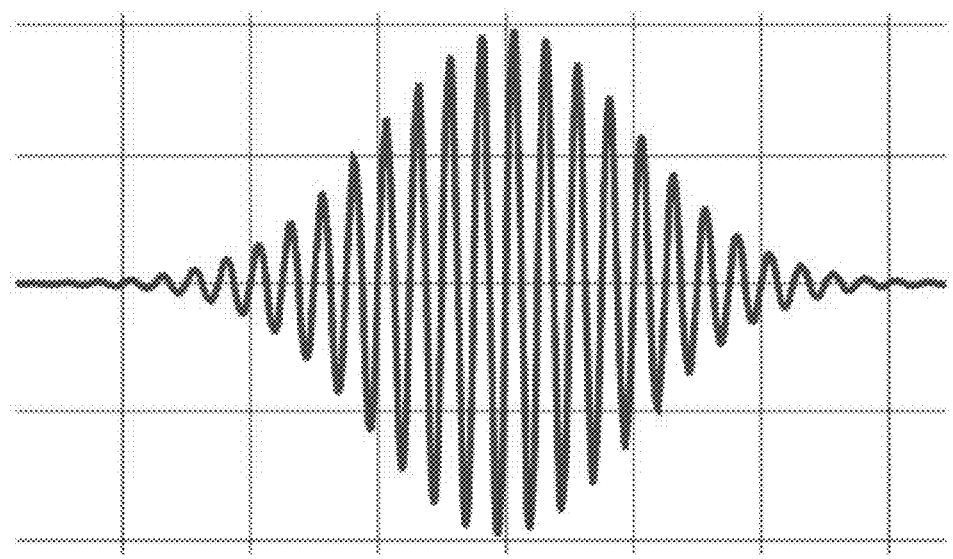
FIG. 1 is a diagram of a wavelet, according to an exemplary embodiment of the present disclosure.

The disclosed embodiments relate to systems and methods for detecting anomalies within a database comprising discrete wavelets, training a deep field network to detect anomalies within a database comprising discrete wavelets, and authorizing a transaction using cascading discrete wavelets. Embodiments of the present disclosure may be implemented using a general-purpose computer. Alternatively, a special-purpose computer may be built according to embodiments of the present disclosure using suitable logic elements.

As used herein, "deep field network" refers to one or more trained algorithms integrated into a prediction schema. In some embodiments, deep field networks may be applied to a multi-nodal manifold converted differential field, e.g., determined based on the difference between a wavelet converted to a tensor and a field of existing (e.g., previous) tensors.

Disclosed embodiments allow for efficient and accurate detection of anomalies within a wavelet database. Additionally, embodiments of the present disclosure allow for efficient and accurate authorization of transactions using a wavelet database. Furthermore, embodiments of the present disclosure provide for greater flexibility and accuracy than extant anomaly detection techniques, such as rule-based determinations, decision trees, and neural networks.

According to an aspect of the present disclosure, a processor may receive a new wavelet. As used herein, the term "wavelet" refers to any data that may be represented as a brief oscillation. The wavelet need not be received in the form of an oscillation but may be represented in any appropriate form (e.g., an array, a digital signal, or the like). The wavelet may be received from one or more memories (e.g., a volatile memory such as a random access memory (RAM) and/or a non-volatile memory such as a hard disk) and/or across one or more computer networks (e.g., the Internet, a local area network (LAN), or the like). Alternatively, the processor may receive data and convert the data into a wavelet. For example, the processor may receive a transaction having associated properties (such as time, location, merchant, amount, etc.) and may convert the transaction into a wavelet or into an array or other format that represents a wavelet.

The processor may convert the wavelet to a tensor. For example, a tensor may represent an array that satisfies one or more mathematical rules (for example, a tensor may be a multi-dimensional array with respect to one or more valid bases of a multi-dimensional space).

In some embodiments, the processor may convert the wavelet to a tensor using a moving average. For example, a simple moving average, a cumulative moving average, a weighted moving average, or the like, may be used to convert the wavelet to a tensor. In certain aspects, the processor may convert the wavelet to a tensor using an exponential smoothing average. By using an exponential smoothing average, the natural base e may be incorporated into the smoothing. Because e represents the limit of compound interest, the smoothed wavelet may be easier to identify as anomalous within a financial market. Accordingly, the processor may perform a discrete wavelet transform with an exponential smoothing average accumulator to transform the received wavelet into a tensor.

The processor may calculate a difference field between the tensor and a field having one or more previous wavelets represented as tensors. For example, the field may have been previously constructed as explained above. That is, the processor may perform a discrete wavelet transform with an exponential smoothing average accumulator to transform the one or more previous wavelets into tensors. The processor may then obtain the field by mapping the tensors onto a manifold (e.g., a differential manifold). One or more atlases may be used in order to do so. Alternatively, the processor may receive the tensors (e.g., from one or more memories and/or over one or more computer networks) and construct the field therefrom or may receive the field directly (e.g., from one or more memories and/or over one or more computer networks).

In some embodiments, the difference field may represent a tensor product of fields (i.e., between a field having only the tensor and the field having the one or more previous wavelets represented as tensors). Accordingly, the difference field may represent a Galois connection between the tensor and the field.

The processor may perform a weighted summation of the difference field to produce a difference vector. For example, the coefficient weights may be derived from training of one or more particular models. For example, the processor may apply a variety of models in the weighting, such as models trained for particular identifiers (e.g., particular accounts, particular persons, particular merchants, particular institutions, etc.), particular times (e.g., time of day, time of year, etc.), particular locations (e.g., particular country, particular city, particular postal code, etc.), or the like.

Additionally or alternatively, the summation may include a notch filter. Accordingly, particular frequencies may be filtered out during the summation. For example, the processor may apply one or more particular models to determine which particular frequencies to filter out. The one or more filter models may be the same models as the one or more weighting models or may be different models.

In some embodiments, an absolute or a squaring function may be applied. Alternatively, the weighted summation may produce a directional difference vector. Accordingly, the difference vector may include a direction of the difference as well as a magnitude of the difference. This additional information may improve accuracy of the anomaly detection. For example, a large difference vector pointing in an expected direction may be less anomalous than a small difference vector pointing in an unexpected direction.

The processor may apply one or more models to the difference vector to determine a likelihood of the new wavelet representing an anomaly. For example, the one or more likelihood models may be the same models as the one or more filter models and/or the one or more weighting models or may be different models. In embodiments having direction as well as magnitude, the one or more models may use the magnitude and direction of the difference vector to determine the likelihood. As used herein, "likelihood" may refer to a percentage (e.g., 50%, 60%, 70%, etc.), a set of odds (e.g., 1:3, 1 in 5, etc.), a score (e.g., 1 out of 5, 5.6 out of 10.0, etc.), an indicator (e.g., "not likely," "likely," "very likely," etc.), or the like.

Based on the likelihood, the processor may either add the new wavelet to the field or reject the new wavelet. For example, the processor may add the new wavelet to the field when the likelihood is below a threshold. If the processor rejects the new wavelet, the processor may send a notification to such effect. For example, the processor may send a rejection signal or a message indicating the likelihood and/or a reason (e.g., based on the one or more models) for rejection. The processor may send the notification to one or more parties associated with the new wavelet (e.g., a financial institution, an individual, a merchant, or the like) and/or to one or more computer systems from which the new wavelet was received (e.g., a personal computer such as a desktop computer or mobile phone, a point-of-service system, a financial processing server, a credit bureau server, or the like).

According to a second aspect of the present disclosure, a processor may receive a plurality of transactions. As used herein, the term "transactions" refers to any data including an indication of an amount of currency or commodity that is transferred between parties. The transactions need not be received in any particular format but may be represented in any appropriate form such as arrays, digital signals, or the like. The transactions may be received from one or more memories (e.g., a volatile memory such as a random access memory (RAM) and/or a non-volatile memory such as a hard disk) and/or across one or more computer networks (e.g., the Internet, a local area network (LAN), or the like). Alternatively, the processor may receive raw data and convert the data into a format representing a transaction. For example, the processor may receive a data with time, location, party identifiers, amount, and the like and may convert this data into a single bundle representing a transaction.

The processor may convert each transaction to a corresponding wavelet. For example, as explained above, the processor may receive a transaction having associated properties (such as time, location, merchant, amount, etc.) and may convert the transaction (along with its associated properties) into a wavelet or into an array or other format that represents a wavelet.

The processor may group the plurality of wavelets and corresponding tensors by coefficients included in the wavelets. For example, the corresponding tensors may be determined using an exponential smoothing average. That is, the processor may perform a discrete wavelet transform with an exponential smoothing average accumulator to transform the wavelets into corresponding tensors.

Because each tensor includes coefficients for each base in the set of bases representing a corresponding multi-dimensional space in which the tensor may be represented, the processor may group the tensors (and therefore, the corresponding wavelets) by these coefficients. Because the coefficients depend on the bases selected (which must satisfy one or more mathematical rules in order to form a mathematically consistent multi-dimensional space), the processor may generate a plurality of groups of coefficients and, thus, a plurality of groupings of the tensors (with the corresponding wavelets). For example, the processor may select bases depending on which factors are most heavily weighted in one or more models and then perform a plurality of groupings, each for a particular model (or set of models) having factors corresponding to the bases used to determine the corresponding grouping.

The processor may train a neural network for each group independently of other groups. Although "neural network" usually refers to a traditional artificial neural network as depicted, for example, in FIG. 9, the processor here may train any model (e.g., the models discussed above with respect to the groupings) that produces a likelihood of a particular tensor being anomalistic within a group. By training each group independently, the processor may develop specialized models that are orders of magnitude greater in number (and, therefore, accuracy) than extant neural networks. For example, the processor may develop thousands (or even millions) of models without requiring exponentially more resources than used to construct a single artificial neural network.

The processor may integrate the neural networks into a deep field network. For example, the models may be combined into a larger predictive scheme. In one particular example, the models may be combined such that when a new tensor is convolved (or otherwise combined with the models), the model trained on the group (or groups) having the most similar coefficients will be amplified while other models (e.g., trained on groups with less similar coefficients) will be minimized.

According to a third aspect of the present disclosure, a processor may receive a new transaction. For example, as explained above, the term "transaction" refers to any data including an indication of an amount of currency or commodity that is transferred between parties. The transaction need not be received in any particular format but may be represented in any appropriate form such as arrays, digital signals, or the like. The transaction may be received from one or more memories (e.g., a volatile memory such as a random access memory (RAM) and/or a non-volatile memory such as a hard disk) and/or across one or more computer networks (e.g., the Internet, a local area network (LAN), or the like). Alternatively, the processor may receive raw data and convert the data into a format representing a transaction. For example, the processor may receive a data with time, location, party identifiers, amount, and the like and may convert this data into a single bundle representing a transaction.

The processor may convert the new transaction to a wavelet. For example, as explained above, the new transaction may have associated properties (such as time, location, merchant, amount, etc.), and the processor may convert the new transaction (along with its associated properties) into a wavelet or into an array or other format that represents a wavelet.

The processor may convert the wavelet to a tensor using an exponential smoothing average. For example, as explained above, the processor may perform a discrete wavelet transform with an exponential smoothing average accumulator to transform the wavelet into a corresponding tensor.

The processor may calculate a difference field between the tensor and a field having one or more previous transactions represented as tensors. For example, as explained above, the processor may have performed a discrete wavelet transform with an exponential smoothing average accumulator to transform the one or more previous transactions into tensors. The processor may then obtain the field by mapping the tensors onto a manifold (e.g., a differential manifold). One or more atlases may be used to map the tensors onto the manifold. Alternatively, the processor may receive the tensors (e.g., from one or more memories and/or over one or more computer networks) and construct the field therefrom or may receive the field directly (e.g., from one or more memories and/or over one or more computer networks).

The processor may perform a weighted summation of the difference field to produce a difference vector. For example, as explained above, the coefficient weights may be derived from training of one or more particular models. For example, the processor may apply a variety of models in the weighting, such as models trained for particular identifiers (e.g., particular accounts, particular persons, particular merchants, particular institutions, etc.), particular times (e.g., time of day, time of year, etc.), particular locations (e.g., particular country, particular city, particular postal code, etc.), or the like.

Additionally or alternatively, the summation may include a notch filter. Accordingly, particular frequencies may be filtered out during the summation. For example, the processor may apply one or more particular models to determine which particular frequencies to filter out. The one or more filter models may be the same models as the one or more weighting models or may be different models.

The processor may apply one or more models to the difference vector to determine a likelihood of the transaction being high risk. For example, the one or more likelihood models may be the same models as the one or more filter models and/or the one or more weighting models or may be different models. In embodiments having direction as well as magnitude, the one or more models may use the magnitude and direction of the difference vector to determine the likelihood. As used herein, "likelihood" may refer to a percentage (e.g., 50%, 60%, 70%, etc.), a set of odds (e.g., 1:3, 1 in 5, etc.), a score (e.g., 1 out of 5, 5.6 out of 10.0, etc.), an indicator (e.g., "not likely," "likely," "very likely," etc.), or the like.

As used herein, "risk" refers to any quantification of the probability of a transaction being lost (e.g., via automatic decline, insolvency of the purchaser, fraudulency, or the like). Accordingly, "high risk" refers to any level of risk that exceeds an acceptable level, whether the acceptable level be predetermined or dynamically determined (e.g., certain purchasers, merchants, regions, times of day, or the like may have differing acceptable levels of risk).

Based on the likelihood, the processor may authorize or deny the new transactions. For example, the processor may authorize the new transaction when the likelihood is below a threshold. If the processor rejects the new wavelet, the processor may send a notification to such effect. For example, the processor may send a rejection signal or a message indicating the likelihood and/or a reason (e.g., based on the one or more models) for rejection. The processor may send the notification to one or more parties associated with the new transaction (e.g., a financial institution, an individual, a merchant, or the like) and/or to one or more computer systems from which the new transaction was received (e.g., a personal computer such as a desktop computer or mobile phone, a point-of-service system, a financial processing server, a credit bureau server, or the like).

In some embodiments, based on the likelihood, the processor may request manual verification of the new transaction. For example, if the likelihood is above a first threshold but below a second threshold, the processor may send one or more messages to one or more parties associated with the new transaction (e.g., a financial institution, an individual, a merchant, or the like) with a request to send confirmation of the new transaction. In such an example, the processor may send a message to a mobile phone and/or email address of the individual to request that the new transaction be verified (e.g., by sending a "Y," "yes," or other affirmative response). Additionally or alternatively, the processor may send a message to a merchant warning that a suspicious transaction has been processed and that the merchant will be denied future transactions if the number of suspicious transactions in a period of time exceeds a threshold.

Turning now to FIG. 1, there is shown an example of a wavelet. For example, the wavelet is an oscillation with an amplitude rising from zero to a maximum and returning to zero over a finite period of time. As explained above, systems of the present disclosure may encode transitions between states, also referred to as events, as wavelets. For example, an event may be visualized as a wavelet in which currency and/or commodity is temporarily disturbed by transfer between parties. The wavelet representing the transaction may be indexed by location, time, category of transaction (e.g., furniture, contractor services, grocery, or the like), and/or other indicators. Alternatively, an event may be a movement or a sequence of states, such as waking up and going to an office. Wavelets may also be determined based on the frequency of an action, as will be described.

Figure 2A:
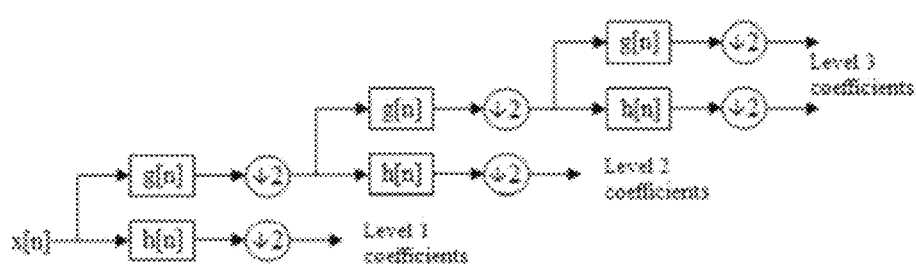
FIG. 2A is a block diagram of a filter bank, according to an exemplary embodiment of the present disclosure.
Figure 2B:
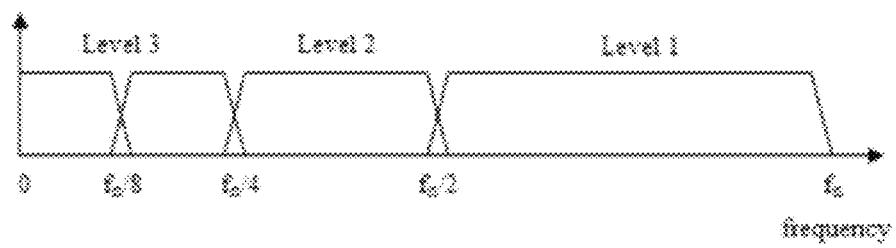
FIG. 2B is a graphical representation of the exemplary filter bank of FIG. 2A.

FIG. 2A depicts an exemplary filter bank used to perform a discrete wavelet transform. For example, as depicted in FIG. 2A, the cascading filters may decompose a signal into low and high frequencies at each level and may produce corresponding coefficients. The decomposition (and corresponding coefficients) may be output from a convolution at each level that samples particular frequencies. A graphical depiction of frequency range for each level of the filters of FIG. 2A is depicted in FIG. 2B.

Figure 3:
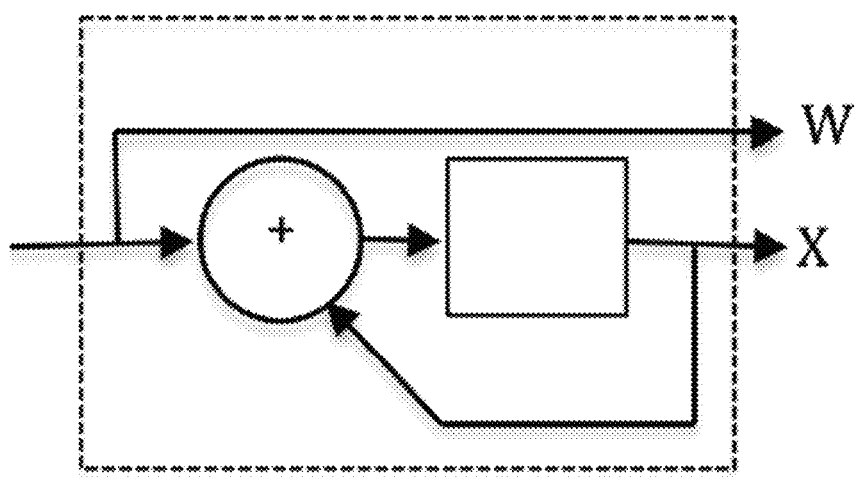
FIG. 3 is a diagram of a convolutional-accumulator, according to an exemplary embodiment of the present disclosure.

FIG. 3 depicts an exemplary convolutional-accumulator. The example of FIG. 3 is systematic because is includes the input data in output W as well as outputting convolution X. Although not depicted, non-systematic convolutional-accumulators may be used in combination with or in lieu of systematic convolutional-accumulators. Furthermore, the example of FIG. 3 is recursive because the convolutional output may be fed back into the convolutional-accumulator for use in other convolutions. Although not depicted, nonrecursive convolutional-accumulators may be used in combination with or in lieu of recursive convolutional-accumulators.

Systems of the present disclosure may use cascading convolution-accumulators, similar to the examples depicted in FIGS. 2 and 3, to perform discrete wavelet transforms and obtain a tensor from the accumulation. In some embodiments, the accumulation function may be an exponential smoothing average to incorporate the natural base e into the tensor.

Figure 4:
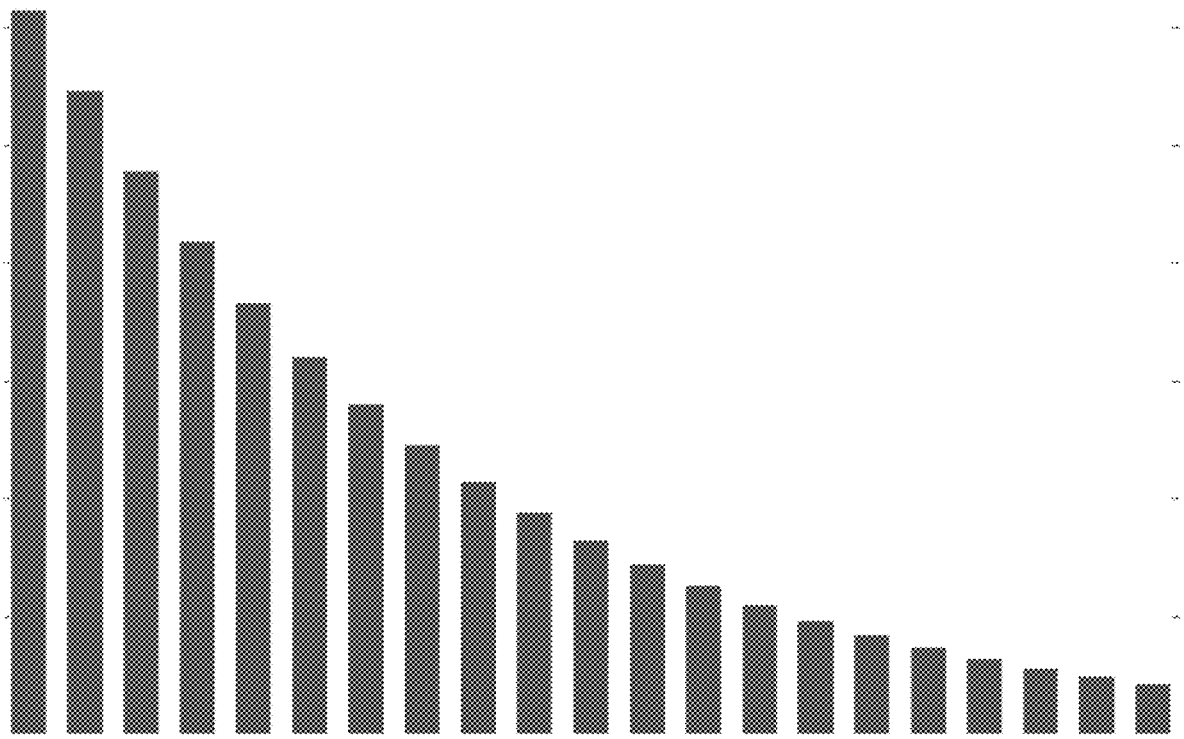
FIG. 4 is a graphical representation of exponential smoothing coefficients, according to an exemplary embodiment of the present disclosure.

FIG. 4 depicts exemplary coefficients (depicted as columns in FIG. 4) used to perform exponential smoothing. As depicted in FIG. 4, the coefficients may exponentially decrease as the number of observations included in the smoothing linearly increases. Accordingly, as explained above, the natural base e is incorporated into the resulting smoothed tensor, which increases the ease of detecting anomalous tensors in financial markets.

Figure 5:
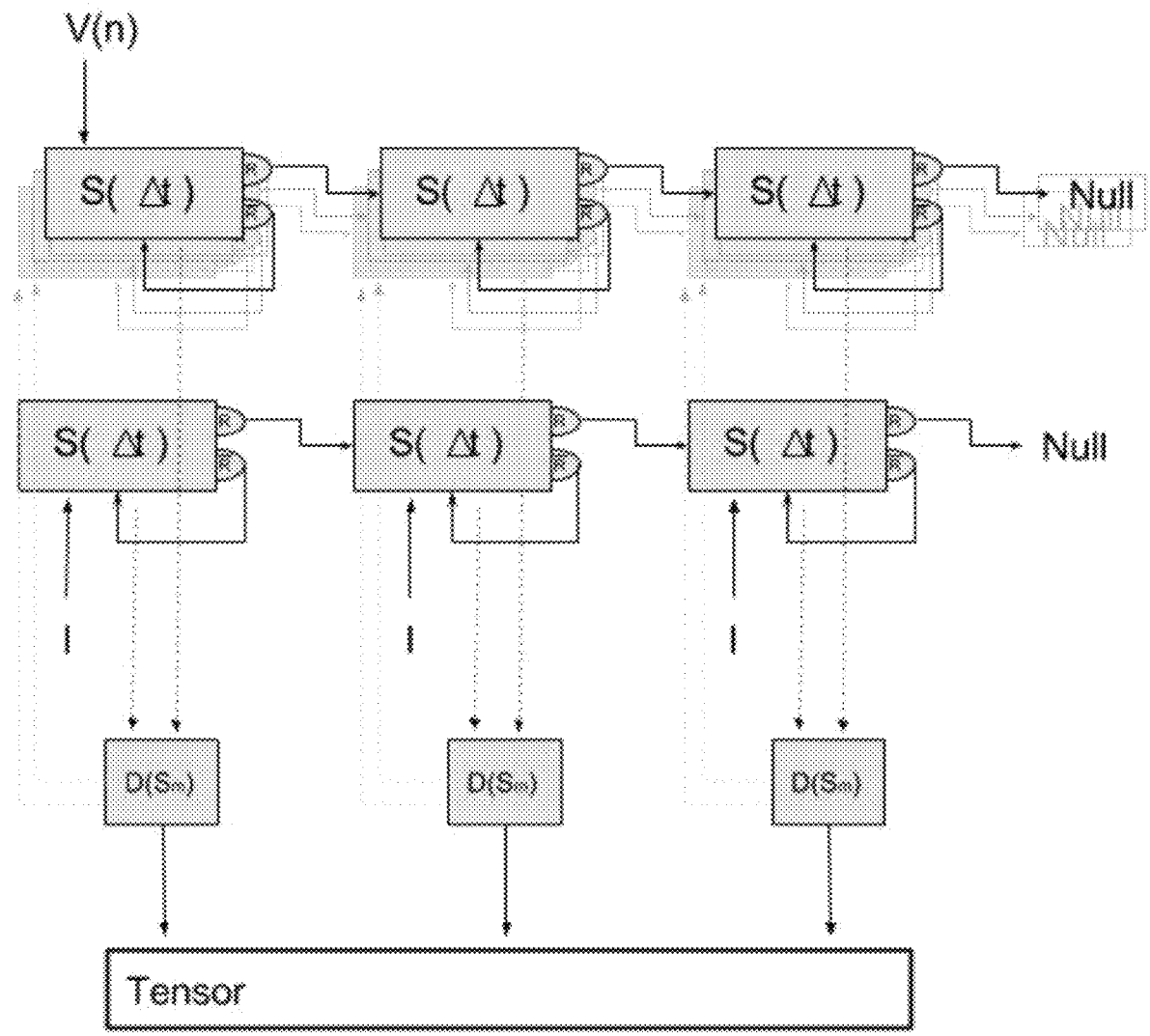
FIG. 5 is a block diagram of tensor extrapolation from wavelets, according to an exemplary embodiment of the present disclosure.

FIG. 5 depicts an exemplary transformation from discrete wavelets (S($\Delta$t) as depicted in FIG. 5) to tensors. In particular, the discrete wavelets may undergo convolution (e.g., recursively as depicted in FIG. 5) followed by one or more accumulating (and smoothing) operations (D($S_m$) as depicted in FIG. 5). For example, D($S_m$) may represent any moving average, such as a simple moving average, a cumulative moving average, a weighted moving average, or the like. In some embodiments, D($S_m$) may represent an exponential smoothing average, as explained above with reference to FIG. 4.

Figure 6:
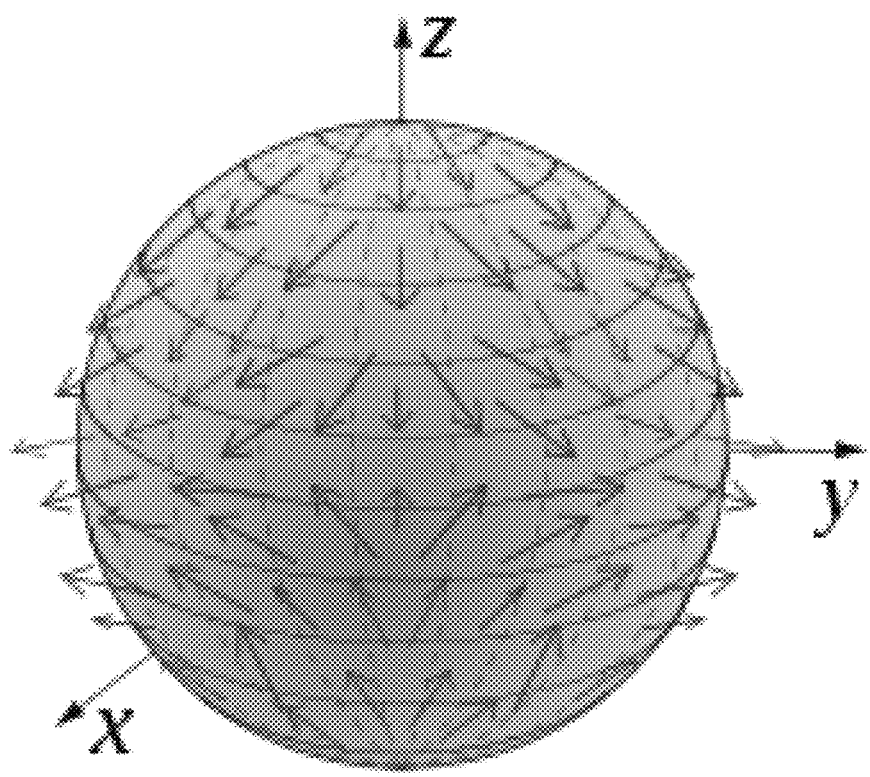
FIG. 6 is a graphical representation of a manifold, according to an exemplary embodiment of the present disclosure.

FIG. 6 depicts an exemplary manifold onto which a plurality of tensors are mapped. For example, similarly to the example of FIG. 6, systems of the present disclosure may map a set of tensors to a differentiable manifold, which is a topological manifold having a differentiable structure. Additionally, similar to the example of FIG. 6, systems of the present disclosure may use a smooth manifold, which is a differentiable manifold having derivatives of all orders that exist across the entire manifold. Additionally, similar to the example of FIG. 6, systems of the present disclosure may use an analytic manifold, which is a smooth manifold whose Taylor series is absolutely convergent. Additionally or alternatively, although not shown in FIG. 6, systems of the present disclosure may use a complex manifold, which is a manifold in complex space that is holomorphic.

Figure 7:
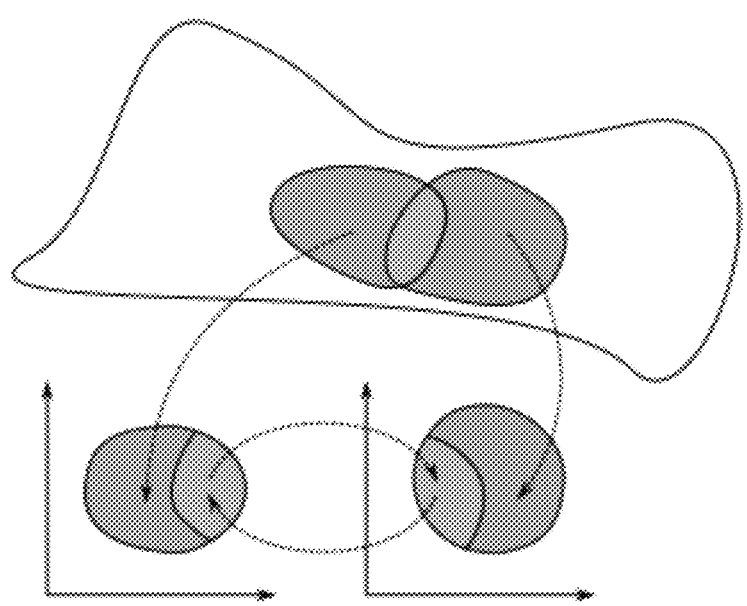
FIG. 7 is a graphical representation of an atlas mapping a manifold to a linear space, according to an exemplary embodiment of the present disclosure.

FIG. 7 depicts an exemplary atlas mapping a subset of points to points on a manifold (such as that depicted in FIG. 6) by an index set. By selecting an appropriate atlas to perform a mapping, various constraints on the resulting manifold may be obtained. For example, by selecting an appropriate atlas, systems of the present disclosure may ensure the mapping of tensors onto a differentiable manifold (or a smooth manifold, an analytic manifold, a complex manifold, or the like).

Figure 8:
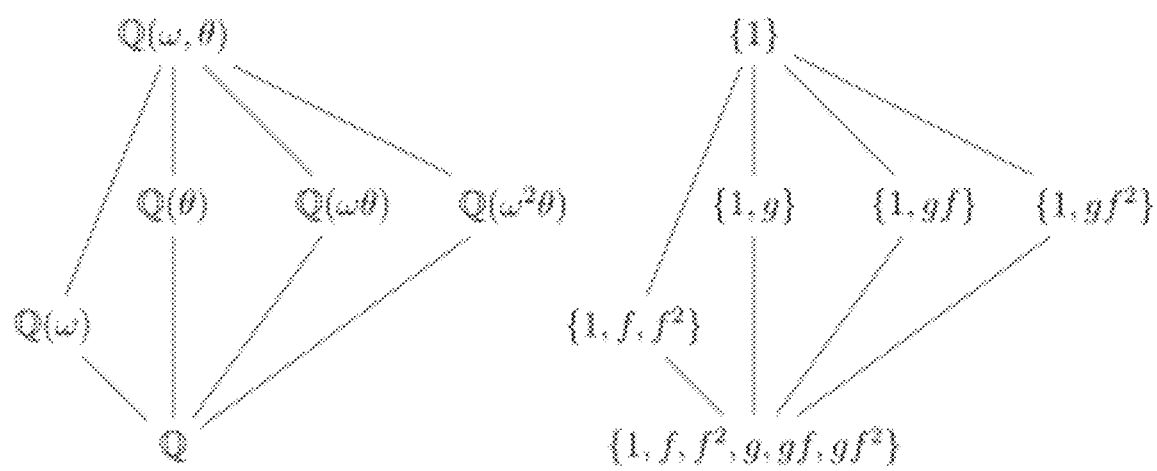
FIG. 8 is a diagram of a Galois connection, according to an exemplary embodiment of the present disclosure.

FIG. 8 depicts an example Galois connection between a base field $\mathbb{Q}$ and a group G={f,f$^2$, g, g f,g f$^2$}. As depicted in FIG. 8, three subgroups of G and three subfields of $\mathbb{Q}$ are isomorphic. Systems of the present disclosure may use a Galois connection between a field and a tensor (or group) to calculate difference vectors while ensuring isomorphism between the field and the tensor.

Figure 9:
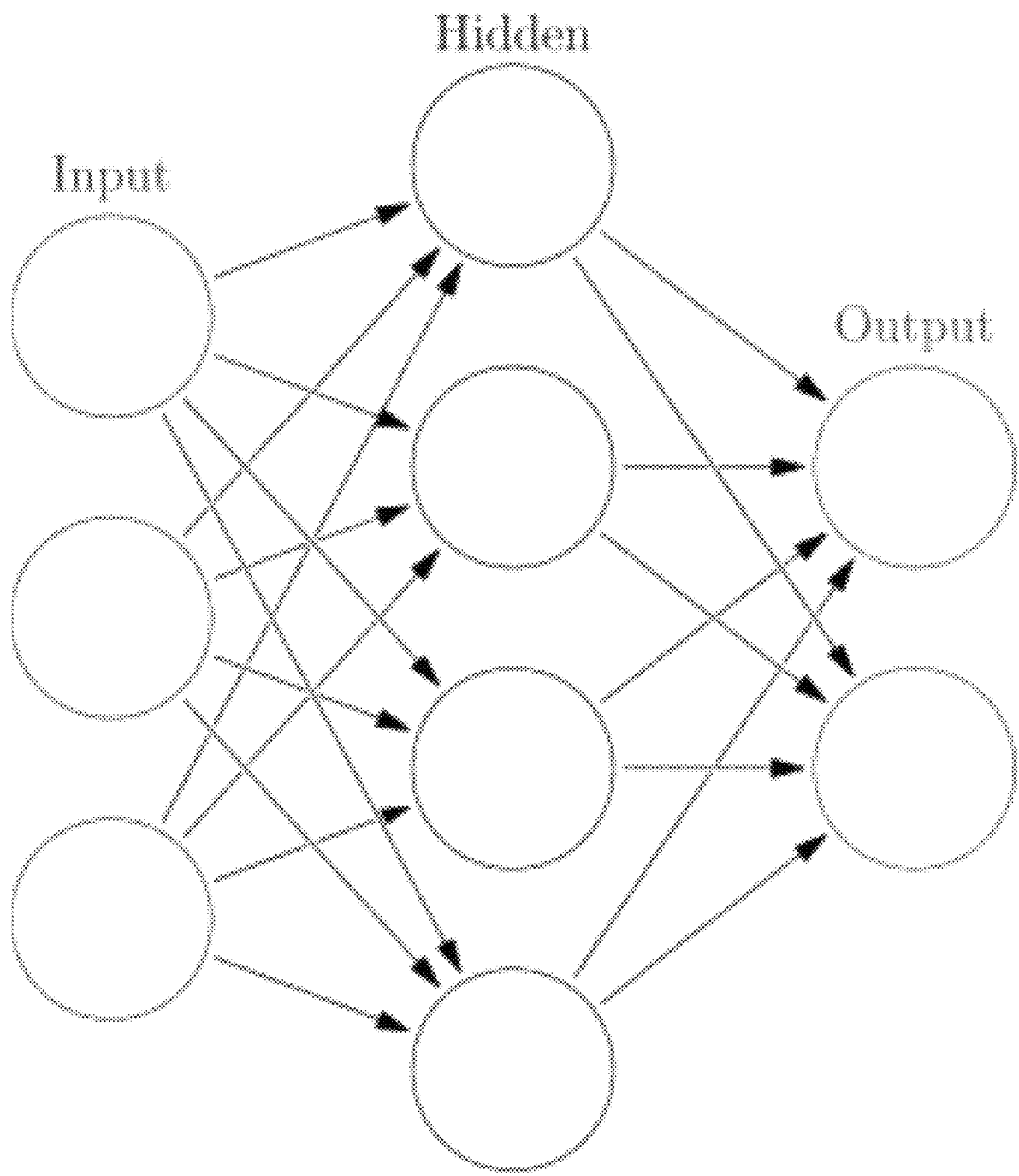
FIG. 9 is a diagram of an exemplary artificial neural network.

FIG. 9 depicts an exemplary artificial neural network as used in extant systems. In neural networks like the example depicted in FIG. 9, one or more inputs (e.g., real numbers) are processed by nodes (or neurons) in a hidden layer in order to produce outputs. Although not depicted in FIG. 9, the hidden layer may comprise a plurality of layers such that some nodes pass their output(s) to an additional hidden layer rather than directing outputting. Each node (or neuron) typically has a weighting function (often non-linear), and its weights are modified during a learning procedure to reduce a loss function (and therefore increase accuracy).

Unlike the Galois connection networks used by systems of the present disclosure, however, neural networks like that depicted in FIG. 9 frequently fail to recognize particular patterns. In addition, there may be significant numbers of false positives (and, correspondingly, false negatives) in the use of neural networks. Galois connection networks developed according to the present disclosure generally produce higher accuracy and, corresponding, lower false positives and false negatives than traditional neural networks.

Figure 10A:
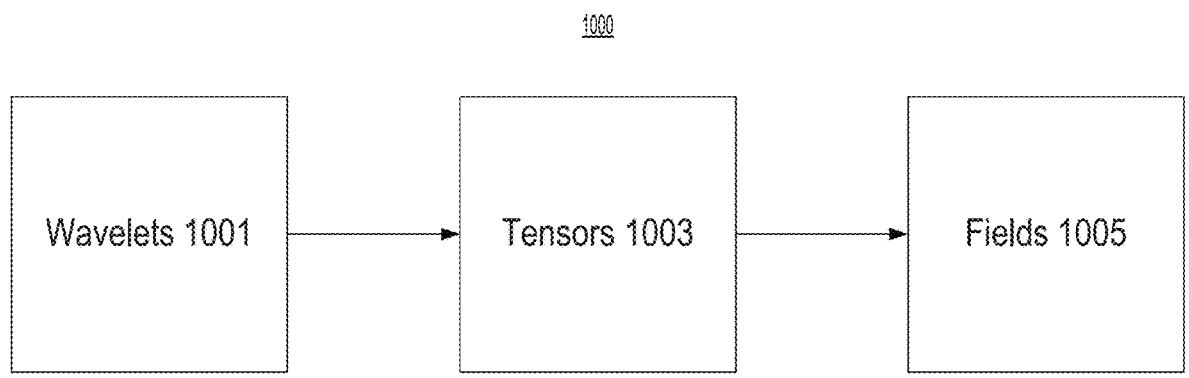
FIG. 10A is a block diagram of an exemplary system for detecting anomalies within a database comprising discrete wavelets, according to an exemplary embodiment of the present disclosure.

FIG. 10A depicts an exemplary system 1000 for detecting anomalies within a database comprising discrete wavelets. System 1000 may be implemented on one or more servers, such as detection server 1801 of FIG. 18. The one or more servers may be housed on one or more server farms.

As depicted in FIG. 10A, system 1000 may use wavelets 1001 as input. For example, as explained above, wavelets 1001 may be received by system 1000 (e.g., from one or more memories and/or over one or more computer networks) and/or determined by system 1000 based on data (e.g., one or more transactions) received by system 1000.

As further depicted in FIG. 10A, system 1000 may convert wavelets 1001 to tensors 1003. For example, as explained above, system 1000 may perform a discrete wavelet transform (that is, a cascading convolution) with a smoothing accumulator to transform the wavelets 1001 to tensors 1003. In some embodiments, a simple moving average, a cumulative moving average, a weighted moving average, or the like, may be used for smoothing. In certain aspects, the smoothing may be an exponential smoothing average. By using an exponential smoothing average, the natural base e may be incorporated into the smoothing.

As further depicted in FIG. 10A, system 1000 may convert tensors 1003 to a field 1005. For example, as explained above, system 1000 may use one or more atlases to map tensors 1003 onto a manifold to form field 1005. In some embodiments, system 1000 may select the one or more atlases to ensure particular properties of the resulting manifold (e.g., to result in a differential manifold, a smooth manifold, an analytic manifold, a complex manifold, or the like).

Field 1005 may be used by system 1000 to detect anomalous wavelets, as explained above. For example, system 1000 may calculate a difference field between a new wavelet and field 1005 and may sum the difference field to form a difference vector. Accordingly, the magnitude and/or direction of the difference vector may be used to determine an anomaly likelihood (e.g., using one or more models, as explained above).

Figure 10B:
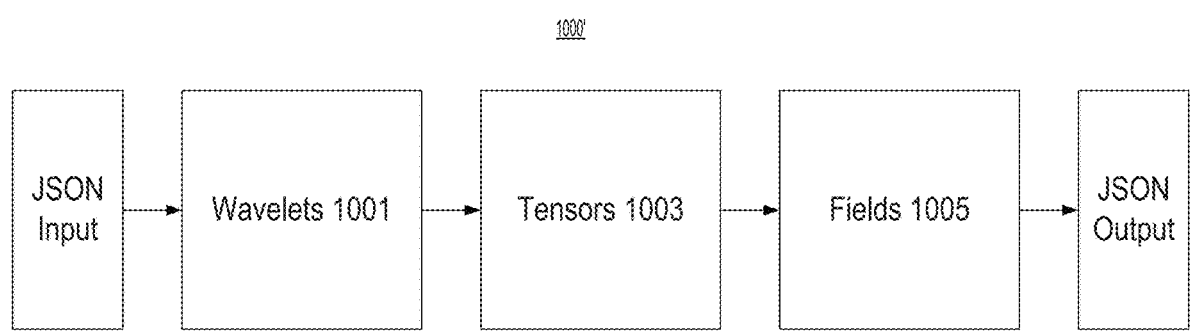
FIG. 10B is a block diagram of another exemplary system for detecting anomalies within a database comprising discrete wavelets, according to an exemplary embodiment of the present disclosure.

FIG. 10B depicts another exemplary system 1000' for detecting anomalies within a database comprising discrete wavelets. System 1000' may be implemented on one or more servers, such as detection server 1801 of FIG. 18. The one or more servers may be housed on one or more server farms.

Similar to system 1000 of FIG. 10A, system 1000' receives wavelets 1001, converts wavelets 1001 to tensors 1003, and maps tensors 1003 to field 1005. In addition, as depicted in FIG. 10B, system 1000' determines wavelets 1001 based on received input comprising JavaScript Object Notation (JSON) data. Additional or alternative data serialization formats, such as Extensible Markup Language (XML), YAML Ain't Markup Language (YAML), or the like. Data serialization formats allow for rapid and lightweight transmission of data (e.g., transactions) to system

1000'. In addition, data serialization formats may allow for direct use of the received data (e.g., for conversion to wavelets or even for direct processing by a discrete wavelet transform) without having to reconstruct a data structure or object therefrom. Furthermore, many extant database structures (such as MongoDB, Oracle NoSQL Database, or the like) support native exportation directly to a data serialization format such as JSON. Accordingly, accepting data serialization formats may allow for faster and more native integration with existing transaction databases.

Figure 10C:
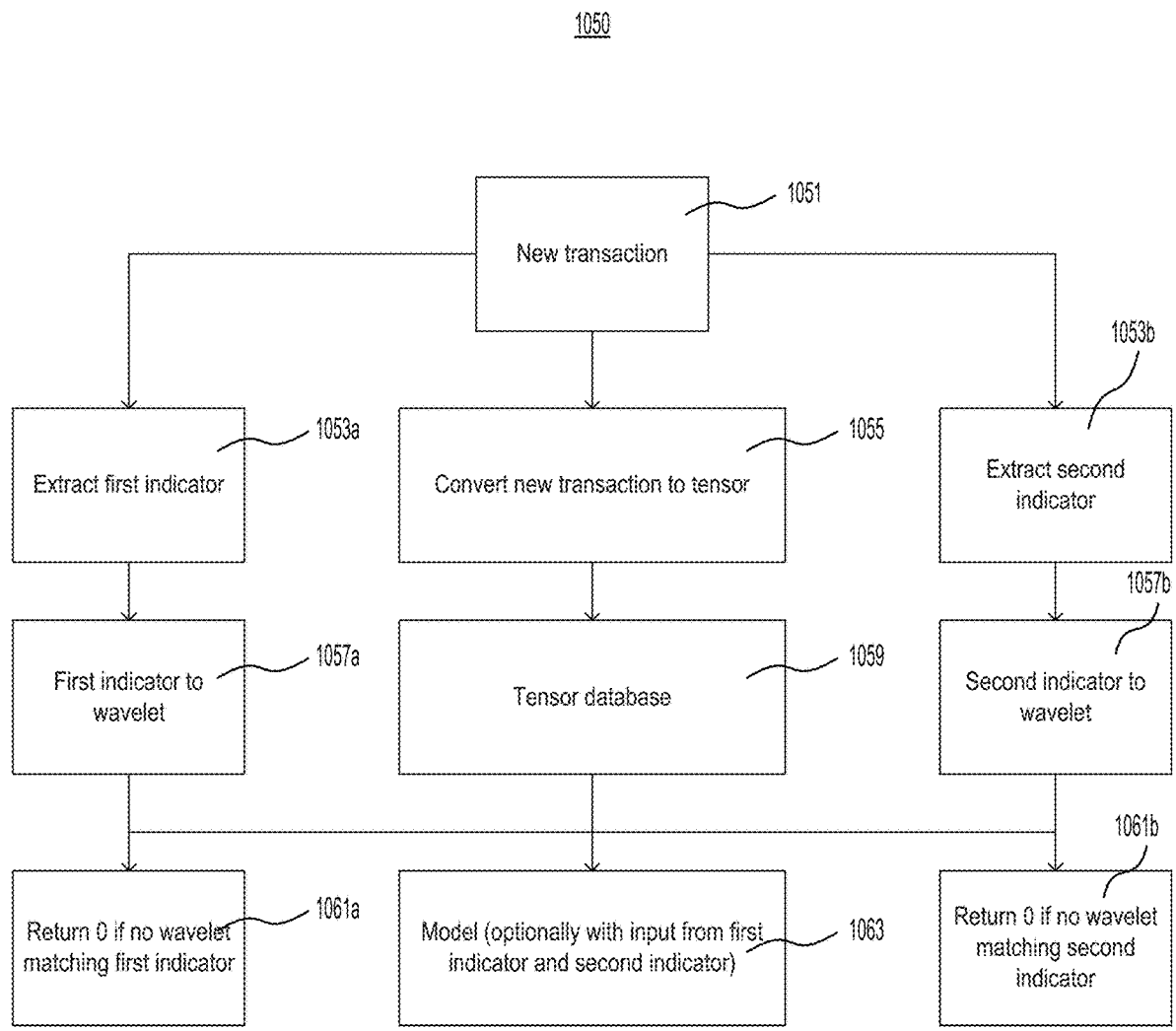
FIG. 10C is a block diagram of an exemplary workflow for detecting high risk transactions using a database comprising discrete wavelets, according to an exemplary embodiment of the present disclosure.

FIG. 10C depicts an exemplary workflow 1050 of detecting a high risk transaction using a database comprising discrete wavelets. For example, workflow 1050 may represent one exemplary usage of system 1000 of FIG. 10A and/or system 1000' of FIG. 10B. In addition to analyzing individual transactions, workflow 1050 may also analyze events and determine if a new event is consistent with previous events.

At step 1051, system 1000 receives a new transaction. For example, as explained above, system 1000 may receive a wavelet representing a transaction, may receive a data serialization format for use as though it were a wavelet, and/or raw data for conversion to a wavelet and/or a data serialization format.

At steps 1053a and 1053b, system 1000 may extract a first indicator and a second indicator from the new transaction. For example, the first indicator may comprise an identifier of a financial account, an identifier of a merchant, a location of the new transaction, a time of the new transaction, an Internet Protocol (IP) address or other identifier of a payment device (e.g., a mobile phone) and/or of a point-of-service system (e.g., a register), or the like. Similarly, the second indicator may comprise an identifier of a financial account, an identifier of a merchant, a location of the new transaction, a time of the new transaction, an IP address or other identifier of a payment device (e.g., a mobile phone) and/or of a point-of-service system (e.g., a register), or the like.

In addition, at step 1055, system 1000 may convert the new transaction to a tensor, as explained above. For example, system 1000 may perform a discrete wavelet transform (that is, a cascading convolution) with a smoothing accumulator to transform the new transaction to a tensor. In some embodiments, a simple moving average, a cumulative moving average, a weighted moving average, or the like, may be used for smoothing. In certain aspects, the smoothing may be an exponential smoothing average. By using an exponential smoothing average, the natural base e may be incorporated into the smoothing.

At steps 1057a and 1057b, system 1000 may use the first indicator and the second indicator to generate wavelets from the new transaction indexed by and/or incorporating the properties of the first indicator and the second indicator. In some embodiments, these wavelets may be further converted to tensors, as explained above.

In addition, at step 1059, system 1000 may determine a difference between the new transaction tensor and an existing tensor database (e.g., a tensor field representing previous transaction tensors mapped to a manifold). For example, as explained above, system 1000 may determine a difference field between the new transaction tensor and the existing tensor database and sum the difference field into a difference vector.

At steps 1061a and 1061b, system 1000 may use the wavelets indexed by and/or incorporated into the first indicator and the second indicator to find matching wavelets in the existing tensor database. For example, system 1000 may determine whether the matching wavelets are in an expected location in the database (e.g., in the field) in order to assist with authorizing the new transaction.

In addition, at step 1063, system 1000 may apply a model (or a plurality of models) to the difference between the new transaction tensor and an existing tensor database. For example, as explained above, system 1000 may apply the model to determine a likelihood of the new transaction being anomalous (and/or high risk). In some embodiments, as depicted in FIG. 10C, system 1000 may include the first indicator and the second indicator as inputs to the model. For example, the first indicator and/or the second indicator may server to select the model (or plurality of models) to apply. In such an example, the selection of the model (or plurality of models) may depend on a particular financial account, a particular merchant, a particular location of the new transaction, a particular time of the new transaction, a particular IP address of a payment device (e.g., a mobile phone) and/or of a point-of-service system (e.g., a register), or any combination thereof.

By using workflow 1050, systems of the present disclosure may incorporate traditional rule-based authentication techniques (e.g., using the first indicator and the second indicator) with the deep field networks disclosed herein. Accordingly, systems of the present disclosure may be used to combine extant transactions authorizations with novel determinations of fraudulency likelihood.

Although FIG. 10C depicts using a first indicator and a second indicator, workflow 1050 of FIG. 10C may incorporate any number of indicators, such as one, two, three, four, five, or the like. In alternative embodiments not depicted, workflow 1050 of FIG. 10C may use the model (or plurality of models) without any additional indicators.

Figure 10D:
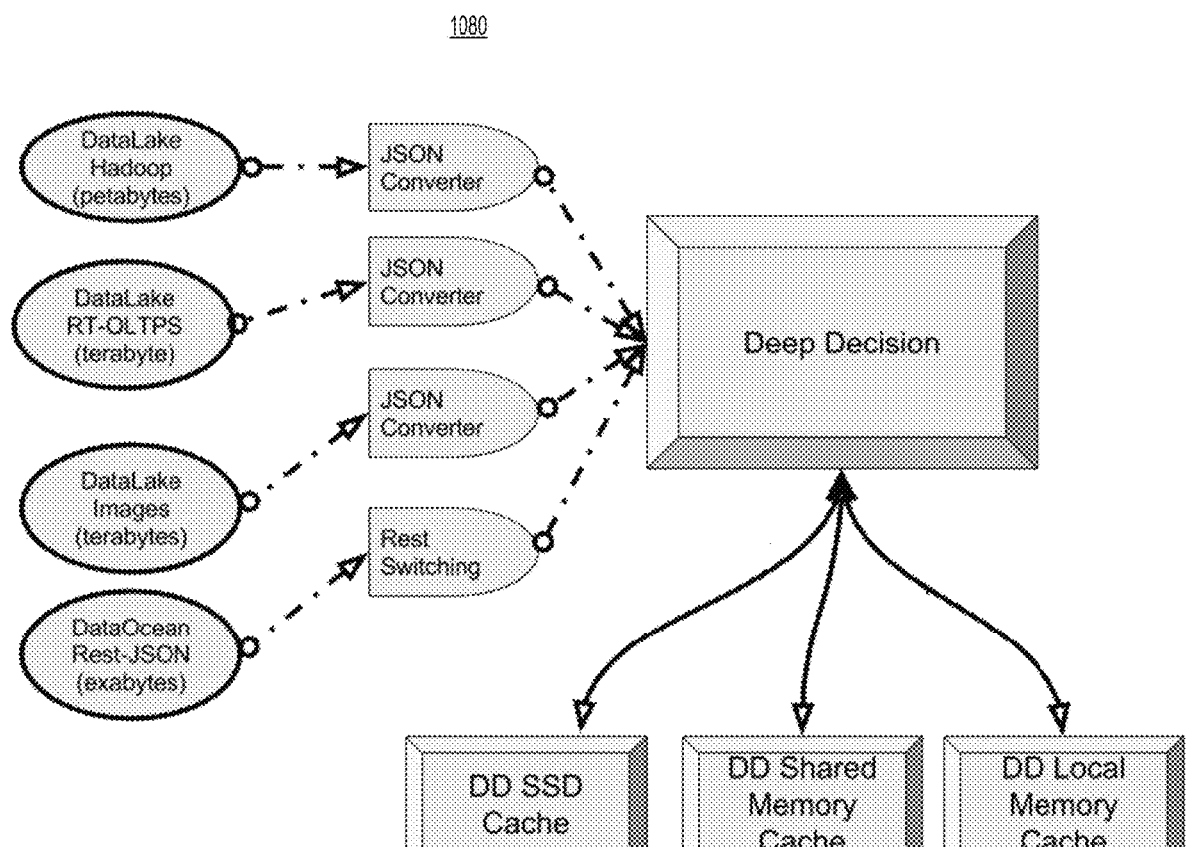
FIG. 10D is a block diagram of an exemplary workflow for constructing and using a database comprising discrete wavelets, according to an exemplary embodiment of the present disclosure.

FIG. 10D depicts an exemplary workflow 1080 of constructing and using a database comprising discrete wavelets. For example, workflow 1080 may represent an additional or alternative example usage of system 1000 of FIG. 10A and/or system 1000' of FIG. 10B.

As depicted in FIG. 10D, one or more sources of transactions for systems of the present disclosure may include one or more data lakes comprising a distributed file system (such as Apache Hadoop or the like), one or more data lakes comprising images (such as Microsoft Azure Data Lake or the like), one or more real-time online transaction processing systems (RT-OLTPS) (such as PayPal or the like), one or more data oceans (such as JSON objects exchanged using a Representational State Transfer (REST) protocol, XML objects exchanged using a Simple Object Access Protocol (SOAP), or the like). Accordingly, system 1000 may receive historical transactions, transactions awaiting authorization, or a combination thereof. Transactions, both historical and pending, may be streamed from a plurality of data sources. Stream collection software which organizes and standardizes a plurality of streams (such as Kafka) may help improve transaction speed and decrease latency. Although depicted as using JSON objects, other data serialization formats such as XML, YAML, or the like, may be used in lieu of or in combination with JSON objects. Additionally, although illustrative examples use transactions to explain the concepts of the present disclosure, other types of data are envisioned, such as data corresponding to events, as described herein.

As further depicted in FIG. 10D, Deep Decision may represent a system according to the present disclosure (e.g., system 1000 of FIG. 10A and/or system 1000' of FIG. 10B). Accordingly, Deep Decision may use received transactions for training one or more models (e.g., according to method 1300 of FIG. 13, described below), for developing a tensor field representing historical transactions (e.g., as described above), and/or for authorizing new, incoming transactions (e.g., according to method 1400 of FIG. 14, described below). Outputs from Deep Decision, which may include, for example, one or more trained models, one or more fields, and/or one or more authorizations, may be stored in one or more caches, as depicted in FIG. 10D. Additionally or alternatively, outputs may be send to other systems, such as a personal computer such as a desktop computer or mobile phone, a point-of-service system, a financial processing server, a credit bureau server, or the like.

Figure 11:
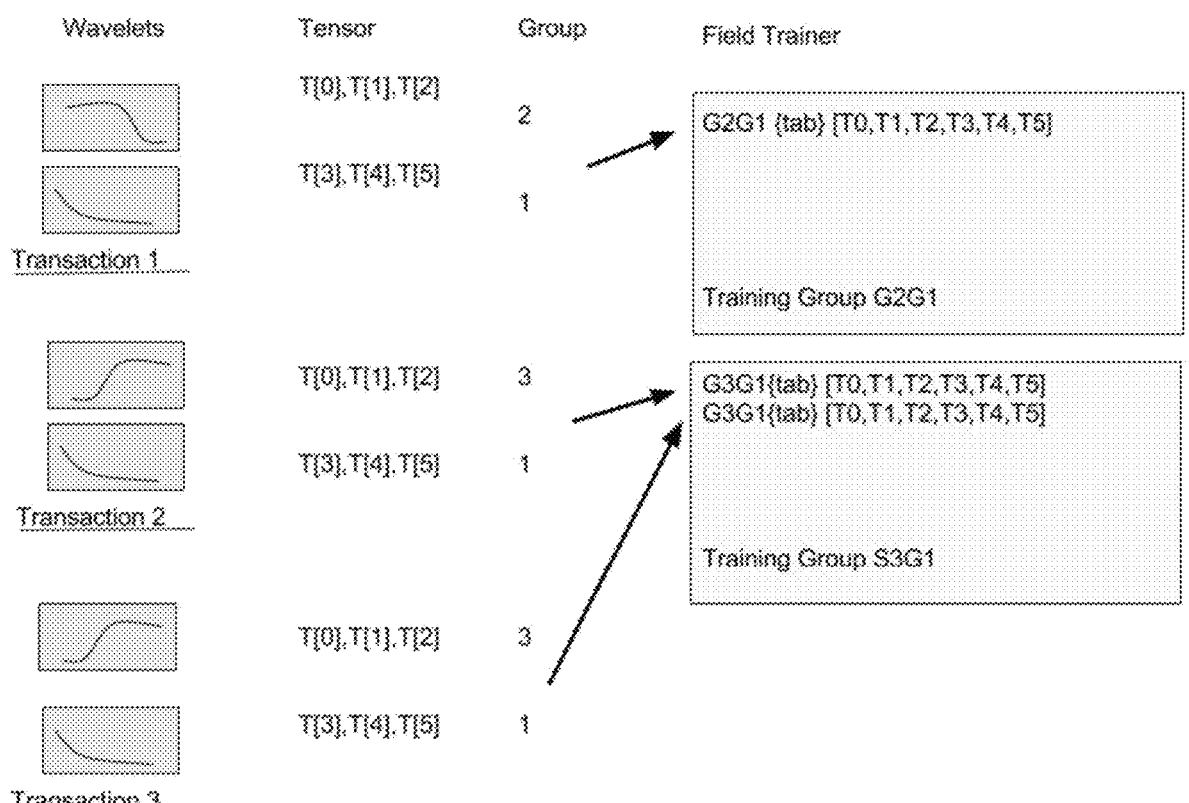
FIG. 11 is a diagram of an example of training a deep field network to detect anomalies within a database comprising discrete wavelets, according to an exemplary embodiment of the present disclosure.

FIG. 11 depicts an example of training a deep field network to detect anomalies within a database comprising discrete wavelets. Example 1100 may represent a training sequence implemented on, for example, system 1000 of FIG. 10A and/or system 1000' of FIG. 10B.

As depicted in FIG. 11, transactions may be represented as one or more wavelets. Although depicted as two wavelets in FIG. 11, a transaction may be represented with any number of wavelets (e.g., one, two, three, four, five, or the like). Additionally, although depicted as each having two wavelets in FIG. 11, different transactions may be represented by different numbers of wavelets. For example, a first transaction may be represented by a single wavelet, and a second transaction may be represented by three wavelets.

Furthermore, as depicted in FIG. 11, the wavelets may be converted to tensors that have coefficients along selected bases. Although the example of FIG. 11 includes three bases, any number of bases (e.g., one, two, three, four, five, or the like) may be used. In addition, the wavelets may be converted to a plurality of tensors, each having different coefficients along different bases.

As further depicted in FIG. 11, the tensors may be grouped based on corresponding coefficients. In the example of FIG. 11, the tensors representing the first transaction are placed in a first group while the tensors representing the second transaction are placed in a second group. Although depicted as grouped together in FIG. 11, tensors representing the same transaction may be placed in different groups based on having different coefficients (e.g., by having different bases). The groups depicted in FIG. 11 may be used to perform training of one or more models for each group (e.g., as discussed with respect to method 1300 of FIG. 13).

Figure 12:
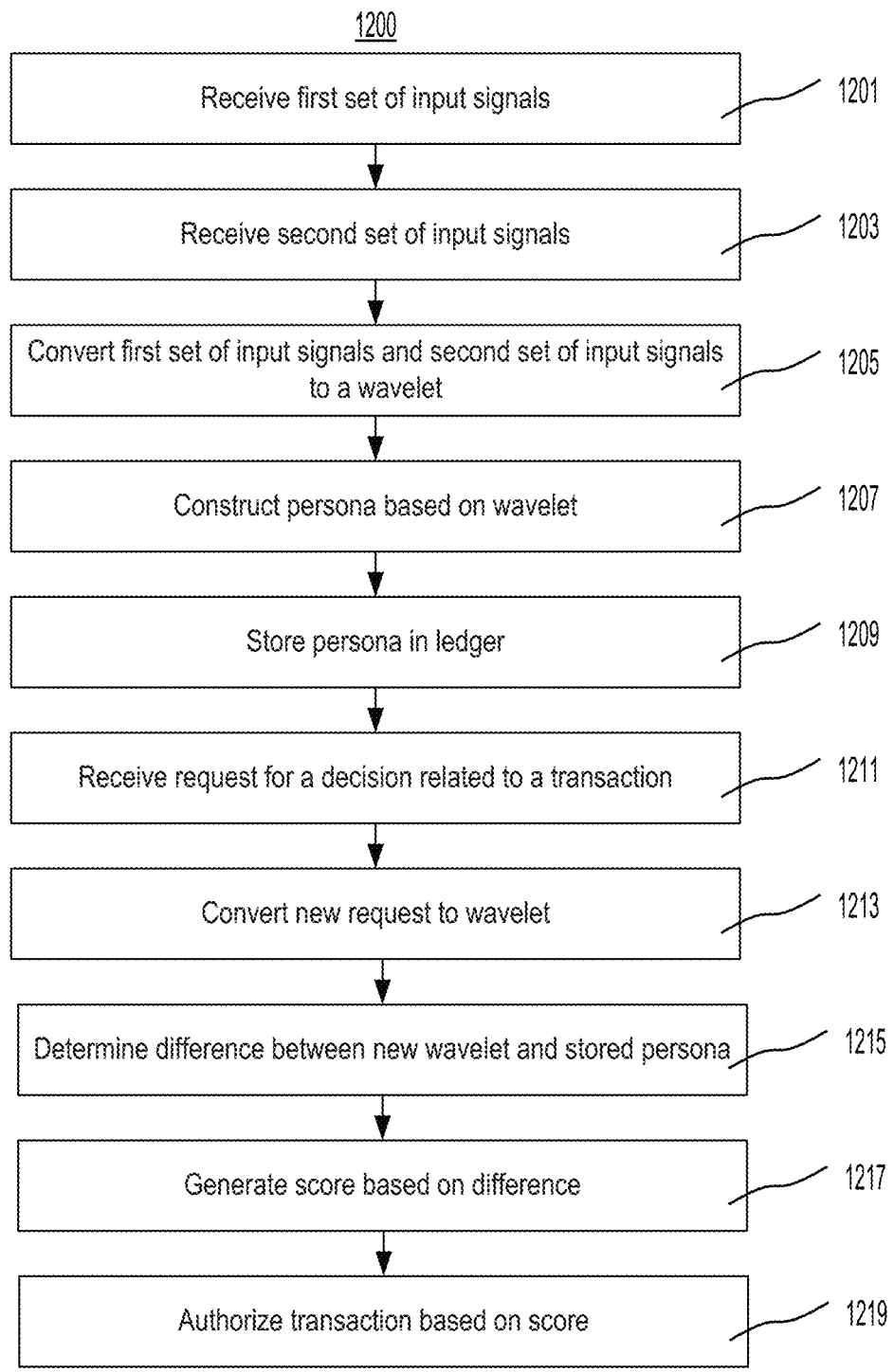
FIG. 12 is a flowchart of an exemplary method for creating and storing personas based on wavelets, according to an exemplary embodiment of the present disclosure.

FIG. 12 is a flowchart of exemplary method 1200 for creating and using personas. A persona may be a digital representation of a person or group of people formed by identifying patterns in a set of transactional messages and/or signals. The persona may be represented by a key-value pair. For example, a set of behaviors defined by wavelets and associated with a person, place, or thing. For instance, a man may have a persona which includes details of his daily activities, and a package may have a persona including details of the package shipment. A persona may also represent a group of people, merchants, geography, or IP addresses. Additionally, a persona may represent composite group types, and group types may be hierarchical. For example, a persona may record transactions associated with a zip code. A higher fidelity persona may further include an IP octet in addition to a zip code. In some embodiments, a persona tied to an individual person may include specific identifiers, such as the person's email address, username, cell phone IMEI or IMSI, and the like, and the specific identifier may further comprise group identifiers. For example, a persona may record information for a person having email address i@email.com with a zip code of 20001. These group identifiers may be used as keys in a dictionary-type data structure, corresponding to values representing wavelets. Method 1200 also allows approving of transactions based on an entity's persona. A man's identity may be confirmed when applying for credit or making a purchase by reference to the man's persona created through method 1200, or a package may be accepted by a recipient by confirming that the package has been in proper shipment channels, for instance, for perishable food shipments. Thus, a transaction may be a request for an entity to change state (i.e., a person changing from applicant to borrower, or a package changing from possession of shipper to possession of recipient). Method 1200 may be implemented using a general-purpose computer including at least one processor, e.g., detection server 1801 of FIG. 18. Alternatively, a special-purpose computer may be built for implementing method 1200 using suitable logic elements.

Step 1201 includes receiving a first set of input signals associated with data from one or more source. Similarly, step 1203 includes receiving a second set of input signals associated with data from one or more source. The data source may be an electronic sensor associated with a user device, such as a camera, microphone, handheld device, or biometric sensor. The data source may also be a stationary device, such as an electronic door or keypad, security cameras, transit passes, and the like. In some embodiments, user interactions may be recorded by servers. For example, user logins and activities on websites or mobile apps, or user interaction with a payment device such as a credit card reader, may cause a server to provide data which is received in step 1201 or step 1203. The device generating input signals may transmit the signals using an application programming interface (API).

Step 1205 includes converting the first set of input signals and the second set of input signals to a wavelet. The wavelet may represent a transition between states which are determined based on the first set of input signals and the second set of input signals. As an example, a woman's cell phone may report an email login followed by activation of a gym membership app. The two input signals may indicate that the woman is at the gym, and step 1206 may convert the two signals to a wavelet similar to that shown in FIG. 1.

Figure 13A:
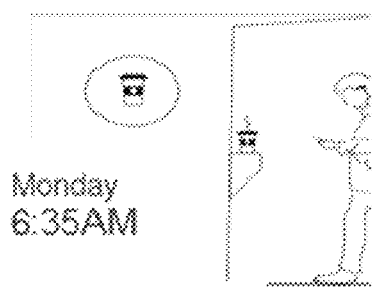
FIGS. 13A-13D are diagrams of potential states for a person, according to an exemplary embodiment of the present disclosure.
Figure 13B:
Figure 13C:
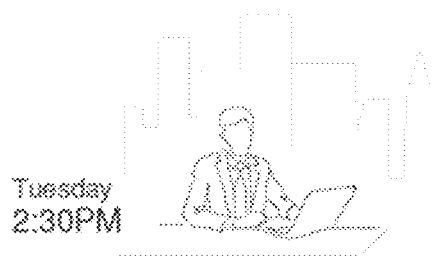
Figure 13D:

Step 1205 may be further understood by reference to FIGS. 13A-13D and FIGS. 14A-14B. FIGS. 13A-13D illustrate possible states for a person. In FIG. 13A, a man is purchasing coffee at 6:35 AM on a Monday. FIG. 13B show the man waiting in an airport at 4:00 PM on a Thursday. FIG. 13C shows the man at his office on 2:30 PM on a Tuesday. Lastly, FIG. 13D illustrated the man teaching his daughter to ride a bike at 11:30 AM on a Sunday. Each of FIGS. 13A-13D thus show different states in which the man may be: purchasing coffee, waiting on a flight, working at his office, and playing with his child.

Sequences of states may uniquely identify the man. For example, the man may routinely buy coffee before logging into his work computer. The frequency of this routine may help identify the man, if, for example, he purchases coffee on the way to work three times per week. A plurality of combinations may further help uniquely identify the man.

Figure 14A:
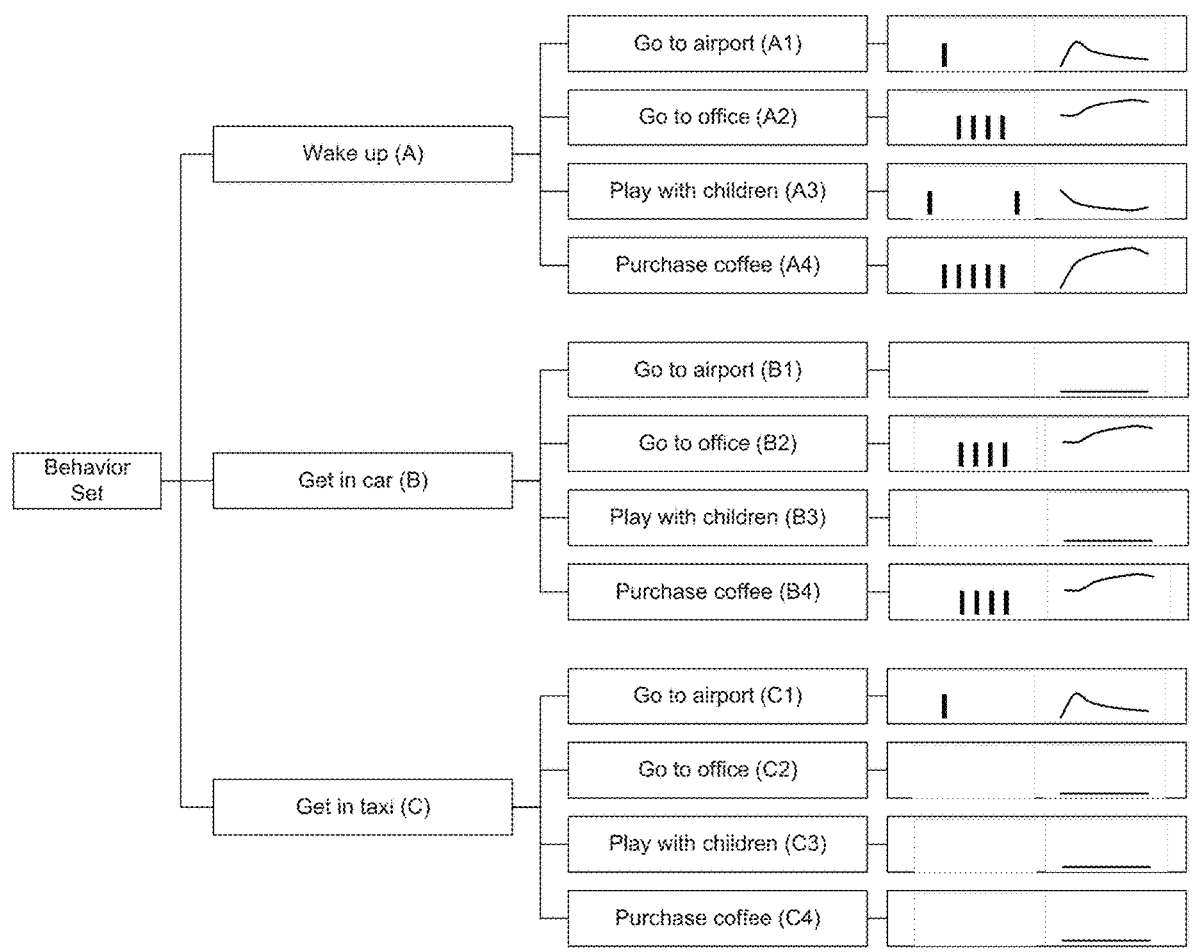
FIG. 14A is a diagram of a persona including permutations of behaviors, according to an exemplary embodiment of the present disclosure.

Thus, a unique persona for a person may be constructed based on permutations of behaviors, such as those illustrated in FIG. 14A. The illustrated behavioral set, which may form the basis of a persona, includes three first actions corresponding to indications, and four second actions corresponding to indications, for a total of twelve possible action sequences. For example, the man illustrated in FIGS. 13A-13D may wake up (A), get in his car (B), or get in a taxi (C). Indications of each action may be an alarm on his phone, a remote start using an app on his phone, or calling a taxi operator, respectively. After each of these first activities, the man may go to the airport, go to the office, play with his children, or purchase coffee.

Further, each sequence may be associated with a frequency. As shown in FIG. 14A, the man wakes up and goes to the airport (A1) once per week, as illustrated by the corresponding histogram. The man also gets into the car and goes to the office (B2) four days per week. As another example, the man gets in a taxi and plays with his children (C3) zero days per week. In some embodiments, histogram counts as illustrated in FIG. 14A may be smoothed or analyzed using a moving average, as illustrated in the graphs adjacent to respective histograms in FIG. 14. By convolving these graphs with wavelets, as described herein, a corresponding wavelet or frequency may be isolated for each sequence.

FIG. 14A illustrates a simplified behavior set for a person, but real-world behavior sets have thousands or even millions of sequence permutations. Further complicating a behavior set is that some sequences may be redundant. For example, wake up and go to the airport (A1) occurs at the same frequency as get in taxi and go to the airport (C1). Additionally, permutations may be reversed. That is, while FIG. 14A shows get in car and purchase coffee (B4), a full behavior set would also include purchase coffee and then get in car. Additional sequence layers (3, 4, 5, etc.) may also be added to provide more thorough actions sequences, such as wake up, play with children, get in car, go to office.

Figure 14B:
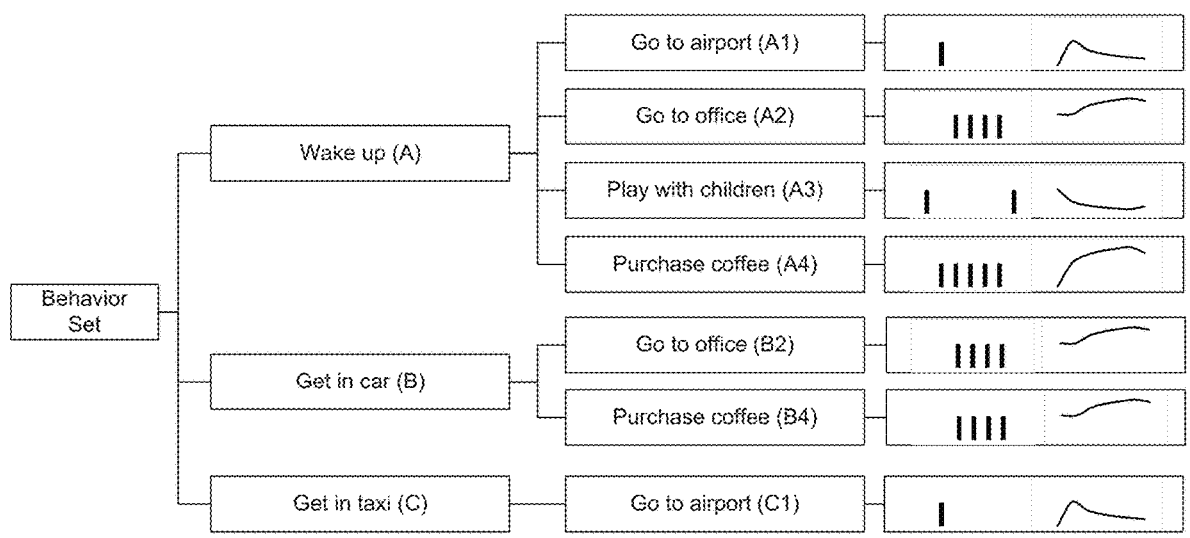
FIG. 14B is a diagram of a persona including permutations of behaviors with low-frequency permutations removed, according to an exemplary embodiment of the present disclosure.

Training models with potentially millions of permutations and sequences of indefinite length results in long training periods for neural networks and other models, as well as high latency for anomaly detection, predictive analysis, and identity validation. Thus, in order to reduce latency, the behavioral set may be trimmed, as shown in FIG. 14B containing a diagram of a persona including permutations of behaviors with low-frequency permutations removed. FIG. 14B includes only seven behavior sequences, as opposed to the twelve sequences of FIG. 14A because low frequency sequences have been trimmed. For example, in FIG. 14A, the sequence get in taxi and go to office (C2) has a frequency of zero, indicating that the man never takes a taxi to the office. Likewise, the sequence get in car and go to airport (B1) also has a frequency of zero, because the man never drives his car to the airport. Thus, these low-frequency events may be eliminated to increase training speed and decrease latency of models.

However, in some embodiments, such as where latency is tolerated, low frequency activities may be retained. For example, someone who has stolen the man's identity, perhaps by stealing a credit card, may frequently take taxis to purchase coffee (C4). Because the man's persona does not include this sequence, a credit card company may recognize the unusual sequence frequency by the thief by comparison to the man's habits, and prevent future transactions as being fraudulent.

Returning to FIG. 12, after converting the input signals to a wavelet at step 1205, method 1200 constructs a persona based on the wavelet at step 1207. The persona may begin with a single wavelet, and more wavelets may be added as more data are collected. To illustrate, in some embodiments, a transaction may be recorded as a JSON file. For example, the JSON file may represent a purchase:

```
{ "email" : "j@email.com" ,
  "address": {
```

```
    "street" :" big street 10"
    "city" :" mycity"
    "zip" :" 95555" },
  "system" :" login" ,
  "status" :" 00"
  "amount" :" 9.99" ,
  "date" :" 202001014:10:01 "
  "tcpip" :" 17.16.15.1"
}
```

The above JSON structure represents a purchase of $9.99 by a person having email j@email.com, from a disclosed physical and IP address. This transaction may be used to create a wavelet represented by a floating point number. In some embodiments, the data may be processed into multiple personas. For example, the same wavelet may be recorded in a first persona having a key of "j@email.com," a second persona may have a key of "95555" representing the zip code, and a third persona may have a key of "95555-17.16" representing the zip code and IP octet.

The persona is also stored in a ledger at step 1209. In some embodiments, a blockchain, such as Etherium or HyperLedger Fabric, may maintain the persona, providing an immutable and secure record of the persona. The entry or persona may have a chain key, such as a GUID, to help quickly identify the persona in a ledger.

Step 1211 includes receiving a request for a decision related to a transaction. The transaction may be an approval for a credit card purchase, approval of a loan application, or approval for a transfer of assets such as stock, currency (including cryptocurrency), intellectual property, or title to tangible property. The request may be received from a third party, such as a broker dealer. In some embodiments, the transaction may include execution of a smart contract. For example, a blockchain, such as the one recording the persona, may run a self-executing smart contract which requires identity confirmation provided by the persona. In some embodiments, the request may be made as part of an attempt to predict future transactions. For example, step 1211 may determine sensitivities associated with the persona that indicate a likelihood of a transaction occurring. Sensitivities may include price, store section location, impulse, placement, display, brand, influential words, premium branding, food consumption, user mood, user dress and appearance, health, environmental, work/life balance, and travel. For example, a persona may show that a person is likely to make high-end retail purchases while travelling, indicating a travel sensitivity associated with the persona.

Step 1213 includes converting the request to a new wavelet. The conversion may be based on preceding states of the requesting party. For example, if a user attempts to purchase coffee, a wavelet may be constructed based on the preceding action in the sequence and the frequency of the sequence including the proposed transaction. Once step 1213 concerts the request to a new wavelet, step 1215 determines a difference between the new wavelet and the stored persona. The new wavelet may indicate a departure from the typical activities included in the persona, such as when the difference is greater than a threshold, or departure from a trend determined from a plurality of stored wavelets.

Step 1217 includes generating a score based on the difference calculated in step 1215. The score may also reflect an aggregate difference for a plurality of wavelets, such as if the requesting party has a plurality of sequences. Some sequences may receive a greater weight than other sequences, such that weight is proportional to frequency. In this manner, a departure from a sequence with a high frequency would have a greater impact on the score than a departure from a sequence with a low frequency.

Step 1219 includes authorizing the transaction based on the score. In the case of a self-executing contract, the blockchain may trigger execution of code which transfers possession of an asset or grants access to information or software. Alternatively or additionally, step 1219 may include relaying the authorization to a third party, which then clears the transaction or advances to a subsequent phase of a transaction. For example, in the case of applying for a loan, method 1200 may verify a person's identity from the associated persona and confirm for a bank that the person has not falsified his identity. Method 1200 may also validate employment, debt, address, and income history. The bank would then rely on the verification provided by method 1200 to complete the approval and provide the loan. If the transaction is validated, method 1200 may update the persona to include the new wavelet.

Further, in some embodiments, the score may be determined by a model, such as a neural network. A plurality of models may be trained having a focus on a particular type of sequence. For example, one model may focus on monetary transactions in a persona, and another model may focus on physical travel. The models may be trained with outside data in addition to data in the person to further develop patterns of typical activity, or to develop patterns of fraudulent activity. Method 1200 may therefore include a step of selecting a model from a plurality of models. Sequence type may inform the selection. Method 1200 then applies the model to the new wavelet to generate the score. In this way, method 1200 may determine more accurately authorize transactions without causing nuisance denials impeding legitimate transactions.

Figure 15:
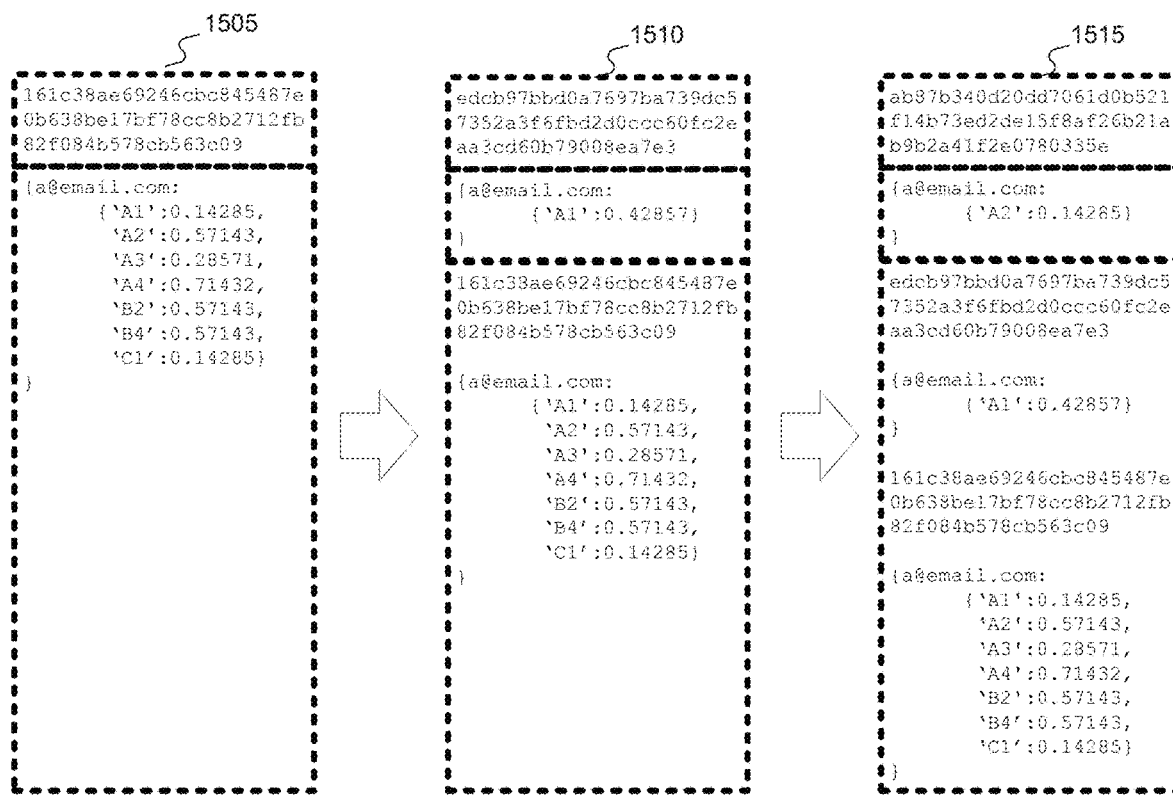
FIG. 15 is a diagram of persona blockchain evolution, according to an exemplary embodiment of the present disclosure.

Steps 1207 through 1219 may be further understood by reference to FIG. 15 showing a diagram of persona blockchain evolution. Block A 1505 of the persona blockchain records sequences and corresponding floating point numbers indicating the sequence frequency. The sequences may be arranged in a data structure, such as a JSON format, having a key corresponding to the entity. For example, block A 1505 shows that a key, a@email.com, is associated with a plurality of sequences A1, A2, A3, A4, B2, B4, and C1 previously illustrated in FIG. 14B. Further, each sequence has a corresponding frequency. Block A 1505 includes a hash value of the key and sequence data.

Block B 1510 illustrates addition of a new activity. Block B 1510 includes the data structure and hash value of block A 1505. However block B 1510 also includes data updating a frequency for a sequence. Namely, sequence A1 for a@email.com has been updated to have a frequency of 0.42857, rather than 0.14285. This may occur, for instance, if the person associated with 0.42857 has performed sequence A1 (i.e., waking up and going to the airport) more frequently than before. Block B 1510 therefore includes the data from block A 1505, the updated data, and a new hash value for both elements. In like manner, block C 1515 appends a new update to sequence A2 to the data from block 1510, and also includes a new hash value. In this way, an immutable ledger of the persona, including all updates, may be maintained and use to verify a person's identity. However, if a new wavelet is rejected as fraudulent or inconsistent based on the score calculated at step 1215 (i.e., the transaction is not authorized), the new data may not be appended to the blockchain.

Figure 16:
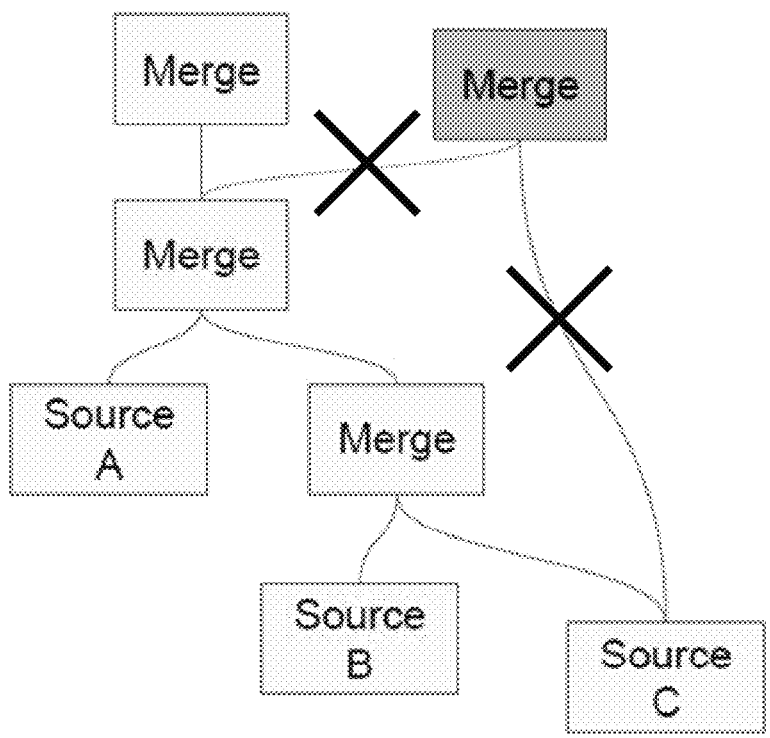
FIG. 16 is a diagram of allowed and forbidden source stream merges, according to an exemplary embodiment of the present disclosure.

FIG. 16 is a diagram of allowed and forbidden source stream merges, according to an exemplary embodiment of the present disclosure. As described with reference to steps 1201 and 1203, a plurality of data sources, such as mobile phone sensors and servers, may provide data which, when combined, provide indications of an action in a sequence. As illustrated in FIG. 16, data from three sources, A, B, and C are merged. Merging may occur prior to associated wavelet data being incorporated into a block chain. Merging may be accomplished by streaming software, such as Kafka, based at least in part on the data belonging to the same persona, such as multiple data sources reporting data associated with email j@email.com. Further, data may be merged in stages. For example, sources B and C are merged in FIG. 16, and the result of that merge is again merged with source A.

However, models that evaluate the data stream may be corrupted if a data stream is re-merged, for instance, by introducing redundant data points which indicate an incorrectly-high frequency of data. To maintain accuracy of models and predictions, embodiments may prevent a second merger of data from an already-merged source, to include any child datasets of the first merger. Thus, as shown in FIG. 16, a merger of source C with the previously-merged data of sources A, B, and C may not occur.

In some scenarios, data may reveal that previously-stored data of a persona was flawed. In early stages of building a persona, fraudulent activities or errant data may be difficult to detect, as models must rely on fewer data points. As time progresses and more data points accumulate, the persona grows in complexity, and an early entry in the persona may be identified as being incorrect, due to fraud or incorrect data entry. Models may identify the incorrect data as being an outlier, or a human may provide an indication that data is incorrect, such as a person correcting a previous address or employer.

Figure 17:
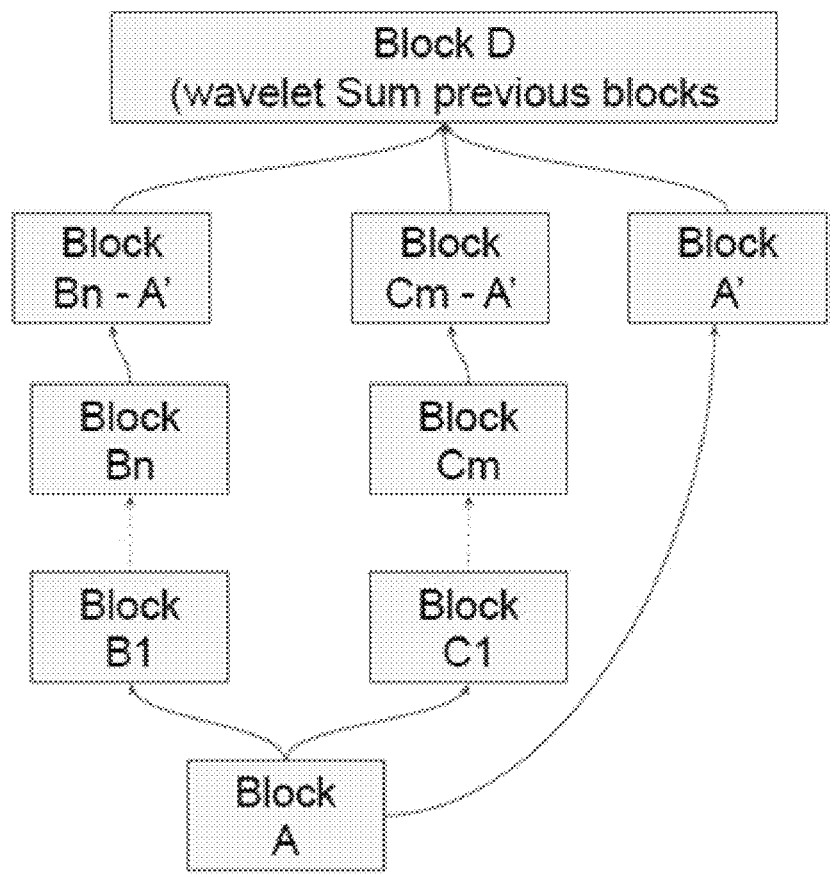
FIG. 17 is a diagram of a persona blockchain fork, according to an exemplary embodiment of the present disclosure.

Thus, method 1200 may include a routine to correct errant data, as illustrated in FIG. 17 showing a diagram of a persona blockchain fork. The routine may include receiving new data indicating that previously-received data is incorrect. For example, in FIG. 17, block A is the last block in the blockchain that does not contain the incorrect data. In other words, the data added to the block during the transition from block A to block B1 was incorrect.

The routine therefore returns to block A, and forks the block chain by creating a new blockchain, A', containing the correct data, updated to a current time. The new blockchain may then be recalculated based on later transactions which may be recorded in the original blockchain. That is, block A' is subtracted from the last block in the B path. Similarly, block A' is subtracted from the last block in the C path. Further, the blockchain and the new blockchain are then remerged into block D, smart contracts are re-executed, and any reversal contracts are initiated. For example, as the new blockchain is calculated, smart contracts included in the blockchain may be re-executed based on the correct data. This may result in a reversal of a previously-executed transfer, such as a transfer of cryptocurrency, or a change in the execution, such as a lower loan amount or higher interest rate. In some cases, the corrected data may result in already-executed contracts being voided. A condition of a smart contract may be that a recipient of transaction, such as a loan, has annual income of more than $100,000 per year. An incorrect entry in a persona indicating that the person makes more than $100,000 would lead to a faulty smart contract execution. Further, an approved transaction may be revealed as fraudulent, and trigger an indication to a regulator or supervisor to further investigate a fraudulent transaction.

Figure 18:
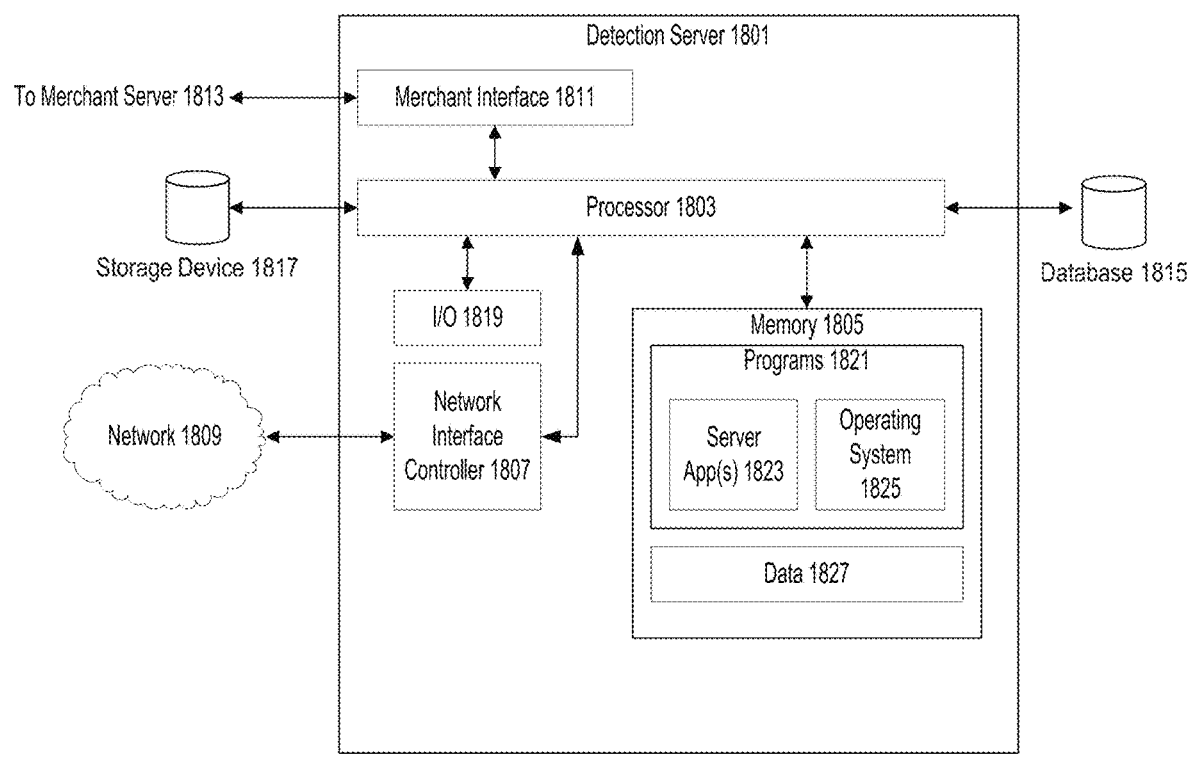
FIG. 18 is a block diagram of an exemplary computing device with which the systems, methods, and apparatuses of the present disclosure may be implemented.

FIG. 18 is a block diagram that illustrates an exemplary detection server 1801 suitable for implementing the disclosed systems and methods. Detection server 1801 may reside on a single server farm or may be distributed across a plurality of server farms.

As depicted in FIG. 18, detection server 1801 may include at least one processor (e.g., processor 1803), at least one memory (e.g., memory 1805), and at least one network interface controller (NIC) (e.g., NIC 1807).

Processor 1803 may comprise a central processing unit (CPU), a graphics processing unit (GPU), or other similar circuitry capable of performing one or more operations on a data stream. Processor 1803 may be configured to execute instructions that may, for example, be stored on memory 1805.

Memory 1805 may be volatile memory (such as RAM or the like) or non-volatile memory (such as flash memory, a hard disk drive, or the like). As explained above, memory 1805 may store instructions for execution by processor 903.

NIC 1807 may be configured to facilitate communication with detection server 1801 over at least one computing network (e.g., network 1809). Communication functions may thus be facilitated through one or more NICs, which may be wireless and/or wired and may include an Ethernet port, radio frequency receivers and transmitters, and/or optical (e.g., infrared) receivers and transmitters. The specific design and implementation of the one or more NICs depend on the computing network 1809 over which detection server 1801 is intended to operate. For example, in some embodiments, detection server 1801 may include one or more wireless and/or wired NICs designed to operate over a GSM network, a GPRS network, an EDGE network, a Wi-Fi or WiMax network, and a Bluetooth® network. Alternatively or concurrently, detection server 1801 may include one or more wireless and/or wired NICs designed to operate over a TCP/IP network.

Processor 1803, memory 1805, and/or NIC 1807 may comprise separate components or may be integrated in one or more integrated circuits. The various components in detection server 1801 may be coupled by one or more communication buses or signal lines (not shown).

As further depicted in FIG. 18, detection server 1801 may include a merchant interface 1811 configured to communicate with one or more merchant servers (e.g., merchant server 1813). Detection server 1801 may communicate with merchant server 1813 (or any other server) using a RESTful API. Although depicted as separate in FIG. 18, merchant interface 1811 may, in whole or in part, be integrated with NIC 1807. In some embodiments, merchant server 1813 may communicate with detection server using a software development kit in order to provide data and receive processing results. For example, merchant server 1813 may send a processing request to detection server 1801 so that detection server 1801 may reply with an identity risk score via a RESTful API. Merchant server 1813 may include databases storing historical transactions and account details, and may also process and/or approve transactions. Further, detection server 1801 may connect directly to data sources (not shown) via network 1809. For instance, merchant server 1813 may provide communication protocols for detection server 1801 to use in order to retrieve or receive data from data providers. In some embodiments, detection server 1801 may operate as a virtual or cloud server.

As depicted in FIG. 18, detection server 1801 may include and/or be operably connected to a database 1818 and/or a storage device 1817. Database 1818 may represent a wavelet database or other digital database, which may be stored, in whole or in part, on detection server 1801 and/or, in whole or in part, on a separate server (e.g., one or more remote cloud storage servers). Storage device 1817 may be volatile (such as RAM or the like) or non-volatile (such as flash memory, a hard disk drive, or the like).

I/O module 1819 may enable communications between processor 1803 and memory 1805, database 1815, and/or storage device 1817.

As depicted in FIG. 18, memory 1805 may store one or more programs 1821. For example, programs 1821 may include one or more server applications 1823, such as applications that facilitate graphic user interface processing, facilitate communications sessions using NIC 1807, facilitate exchanges with merchant server 1813, or the like. By way of further example, programs 1821 may include an operating system 1825, such as DRAWIN, RTXC, LINUX, iOS, UNIX, OS X, WINDOWS, or an embedded operating system such as VXWorkS. Operating system 1825 may include instructions for handling basic system services and for performing hardware dependent tasks. In some implementations, operating system 1825 may comprise a kernel (e.g., UNIX kernel). Memory 1805 may further store data 1827, which may be computed results from one or more programs 1821, data received from NIC 1807, data retrieved from database 1815 and/or storage device 1817, and/or the like.

Each of the above identified instructions and applications may correspond to a set of instructions for performing one or more functions described above. These instructions need not be implemented as separate software programs, procedures, or modules. Memory 1805 may include additional instructions or fewer instructions. Furthermore, various functions of detection server 1801 may be implemented in hardware and/or in software, including in one or more signal processing and/or application specific integrated circuits.

The foregoing description has been presented for purposes of illustration. It is not exhaustive and is not limited to precise forms or embodiments disclosed. Modifications and adaptations of the embodiments will be apparent from consideration of the specification and practice of the disclosed embodiments. For example, the described implementations include hardware and software, but systems and methods consistent with the present disclosure can be implemented with hardware alone. In addition, while certain components have been described as being coupled to one another, such components may be integrated with one another or distributed in any suitable fashion.

Moreover, while illustrative embodiments have been described herein, the scope includes any and all embodiments having equivalent elements, modifications, omissions, combinations (e.g., of aspects across various embodiments), adaptations and/or alterations based on the present disclosure. The elements in the claims are to be interpreted broadly based on the language employed in the claims and not limited to examples described in the present specification or during the prosecution of the application, which examples are to be construed as nonexclusive.

Instructions or operational steps stored by a computer-readable medium may be in the form of computer programs, program modules, or codes. As described herein, computer programs, program modules, and code based on the written description of this specification, such as those used by the processor, are readily within the purview of a software developer. The computer programs, program modules, or code can be created using a variety of programming techniques. For example, they can be designed in or by means of Java, C, C++, assembly language, or any such programming languages. One or more of such programs, modules, or code can be integrated into a device system or existing communications software. The programs, modules, or code can also be implemented or replicated as firmware or circuit logic.

The features and advantages of the disclosure are apparent from the detailed specification, and thus, it is intended that the appended claims cover all systems and methods falling within the true spirit and scope of the disclosure. As used herein, the indefinite articles "a" and "an" mean "one or more." Similarly, the use of a plural term does not necessarily denote a plurality unless it is unambiguous in the given context. Words such as "and" or "or" mean "and/or" unless specifically directed otherwise. Further, since numerous modifications and variations will readily occur from studying the present disclosure, it is not desired to limit the disclosure to the exact construction and operation illustrated and described, and accordingly, all suitable modifications and equivalents may be resorted to, falling within the scope of the disclosure.

Other embodiments will be apparent from consideration of the specification and practice of the embodiments disclosed herein. It is intended that the specification and examples be considered as example only, with a true scope and spirit of the disclosed embodiments being indicated by the following claims.

What is claimed is:

1. A system for creating and using personas, comprising:
a memory storing instructions; and
at least one processor configured to execute the instructions to perform operations comprising:
receiving a first set of input signals associated with first data from one or more sources;
receiving a second set of input signals associated with the first data from the one or more sources;
converting the first set of input signals and the second set of input signals to a first wavelet, wherein the first wavelet represents a transition between activities of a person determined based on the first set of input signals and the second set of input signals;
constructing a persona based on the first wavelet, wherein the persona is a digital representation of the activities of the person;
storing the persona in a ledger, wherein the stored persona is trained with subsequent wavelets of the person to form a field and maintained by a first blockchain;
receiving a request for a decision related to a transaction associated with the person;
converting the request to a second wavelet represented as a tensor;
determining a difference vector between the second wavelet represented as the tensor and the stored persona represented as the field;
generating a likelihood score based on the difference vector; and
authorizing the transaction based on the likelihood score,
wherein the authorized transaction is recorded in the first blockchain, creating an immutable ledger of the persona.

2. The system of claim 1, wherein the operations further comprise:
determining a trend from a plurality of stored wavelets.

3. The system of claim 1, wherein the first set of input signals and the second set of input signals are received using at least one application programming interface (API).

4. The system of claim 1, wherein the one or more sources comprises at least one of a website or a payment device.

5. The system of claim 1, wherein the one or more sources is a handheld device including at least one of a camera, a microphones, or biometric sensor.

6. The system of claim 1, wherein generating a score comprises:
selecting a model from a plurality of models; and
applying the selected model to the second wavelet to generate the score.

7. The system of claim 1, wherein the transaction is a smart contract running on the first blockchain.

8. The system of claim 7 wherein the operations further comprise:
receiving second data indicating that at least a portion of the first data is incorrect;
determining a block in the first blockchain that does not contain incorrect data;
forking the first blockchain by creating a second blockchain with correct data;
merging the first blockchain and the second blockchain; and
re-executing the smart contract.

9. The system of claim 1, wherein the operations further comprise:
merging third data from a first source with fourth data from a second source into a merged data set; and
preventing a second merger of the third data from the first source and the fourth data from the second source with the merged data and any child datasets of the merged data.

10. A non-transitory computer-readable storage medium containing instructions that, when executed by one or more processors, cause the one or more processors to perform operations comprising:
receiving a first set of input signals associated with first data from one or more sources;
receiving a second set of input signals associated with the first data from one or more sources;
converting the first set of input signals and the second set of input signals to a first wavelet, wherein the first wavelet represents a transition between activities of a person determined based on the first set of input signals and the second set of input signals;
constructing a persona based on the first wavelet, wherein the persona is a digital representation of the activities of the person;
storing the persona in a ledger, wherein the stored persona is trained with subsequent wavelets of the person to form a field and maintained by a first blockchain;
receiving a request for a decision related to a transaction associated with the person;
converting the request to a second wavelet represented as a tensor;
determining a difference vector between the new second wavelet represented as the tensor and the stored persona represented as the field;
generating a likelihood score based on the difference vector; and
authorizing the transaction based on the likelihood score,
wherein the authorized transaction is recorded in the first blockchain, creating an immutable ledger of the persona.

11. The medium of claim 10, wherein the operations further comprise:
determining a trend from a plurality of stored wavelets.

12. The medium of claim 11, wherein the first set of input signals and the second set of input signals are received using at least one application programming interface (API).

13. The medium of claim 10, wherein the one or more sources comprises at least one of a website or a payment device.

14. The medium of claim 10, wherein the one or more sources is a handheld device including at least one of a camera, a microphones, or biometric sensor.

15. The medium of claim 10, wherein generating a score comprises:
   selecting a model from a plurality of models; and
   applying the selected model to the second wavelet to generate the score.

16. The medium of claim 10, wherein the transaction is a smart contract running on the first blockchain.

\* \* \* \* \*

UNITED STATES PATENT AND TRADEMARK OFFICE
CERTIFICATE OF CORRECTION

PATENT NO. : 11,556,927 B2
APPLICATION NO. : 16/926099
DATED : January 17, 2023
INVENTOR(S) : Scott Edington et al.

It is certified that error appears in the above-identified patent and that said Letters Patent is hereby corrected as shown below:

In the Claims

Claim 5, Column 22, Lines 2-3, "a microphones" should read --a microphone--.

Claim 14, Column 23, Line 6, "a microphones" should read --a microphone--.

Signed and Sealed this
Twenty-eighth Day of March, 2023

Katherine Kelly Vidal
*Director of the United States Patent and Trademark Office*